US012573608B2

(12) United States Patent
Yamazaki et al.

(10) Patent No.: US 12,573,608 B2
(45) Date of Patent: *Mar. 10, 2026

(54) SECONDARY BATTERY

(71) Applicant: SEMICONDUCTOR ENERGY LABORATORY CO., LTD., Atsugi (JP)

(72) Inventors: Shunpei Yamazaki, Tokyo (JP); Teppei Oguni, Atsugi (JP); Tamae Moriwaka, Isehara (JP); Junpei Momo, Sagamihara (JP); Ryota Tajima, Isehara (JP); Nobuhiro Inoue, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 132 days.

This patent is subject to a terminal disclaimer.

(21) Appl. No.: 18/218,248

(22) Filed: Jul. 5, 2023

(65) Prior Publication Data

US 2023/0361271 A1     Nov. 9, 2023

Related U.S. Application Data

(63) Continuation of application No. 16/904,618, filed on Jun. 18, 2020, now Pat. No. 11,699,782, which is a
(Continued)

(30) Foreign Application Priority Data

Jul. 20, 2012     (JP) ................................. 2012-161489

(51) Int. Cl.
      *H01M 4/133*     (2010.01)
      *H01M 4/36*     (2006.01)
      *H01M 4/587*     (2010.01)

(52) U.S. Cl.
      CPC ........... *H01M 4/133* (2013.01); *H01M 4/366* (2013.01); *H01M 4/587* (2013.01)

(58) Field of Classification Search
      CPC ...... H01M 4/133; H01M 4/366; H01M 4/587; Y02E 60/10
      See application file for complete search history.

(56) References Cited

U.S. PATENT DOCUMENTS 6,218,050 B1     4/2001   Yoon et al.
7,179,561 B2     2/2007   Niu et al.
(Continued)

FOREIGN PATENT DOCUMENTS

JP           08-111219  A      4/1996
JP           11-096995  A      4/1999
(Continued)

OTHER PUBLICATIONS

Takamura.T et al., "Identification of Nano-Sized Holes by TEM in the Graphene Layer of Graphite and the High Rate Discharge Capability of Li-Ion Battery Anodes", Electrochemica Acta, 2007, vol. 53, pp. 1055-1061.
(Continued)

*Primary Examiner* — Eugenia Wang
(74) *Attorney, Agent, or Firm* — NIXON PEABODY LLP; Jeffrey L. Costellia

(57)           ABSTRACT

A secondary battery in which graphite that is an active material can occlude and release lithium efficiently is provided. Further, a highly reliable secondary battery in which the amount of lithium inserted and extracted into/from graphite that is an active material is prevented from varying is provided. The secondary battery includes a negative electrode including a current collector and graphite provided over the current collector, and a positive electrode. The graphite includes a plurality of graphene layers. Surfaces of
(Continued)

the plurality of graphene layers are provided substantially along the direction of an electric field generated between the positive electrode and the negative electrode.

5 Claims, 15 Drawing Sheets

Related U.S. Application Data continuation of application No. 13/940,287, filed on Jul. 12, 2013, now abandoned.

(56) References Cited

U.S. PATENT DOCUMENTS

| | | | |
|---|---|---|---|
| 7,326,497 B2 | 2/2008 | Matsubara et al. | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 9,384,904 B2 | 7/2016 | Inoue et al. | |
| 9,685,653 B2 | 6/2017 | Inoue et al. | |
| 9,754,728 B2 | 9/2017 | Inoue et al. | |
| 9,899,660 B2 | 2/2018 | Inoue et al. | |
| 2008/0254296 A1 | 10/2008 | Handa et al. | |
| 2009/0325071 A1 | 12/2009 | Verbrugge et al. | |
| 2010/0021819 A1* | 1/2010 | Zhamu | H01G 11/42 |
| | | | 429/231.8 |
| 2010/0143798 A1 | 6/2010 | Zhamu et al. | |
| 2010/0176337 A1 | 7/2010 | Zhamu et al. | |
| 2010/0248034 A1 | 9/2010 | Oki et al. | |
| 2010/0330421 A1 | 12/2010 | Cui et al. | |
| 2011/0012067 A1 | 1/2011 | Kay | |
| 2011/0111303 A1 | 5/2011 | Kung et al. | |
| 2011/0121240 A1 | 5/2011 | Amine et al. | |
| 2011/0136014 A1 | 6/2011 | Kay | |
| 2011/0159372 A1 | 6/2011 | Zhamu et al. | |
| 2011/0229772 A1 | 9/2011 | Fujinami et al. | |
| 2011/0229795 A1 | 9/2011 | Niu et al. | |
| 2011/0269016 A1 | 11/2011 | Takeuchi et al. | |
| 2012/0045692 A1 | 2/2012 | Takemura et al. | |
| 2012/0183860 A1 | 7/2012 | Naoi et al. | |
| 2012/0244430 A1 | 9/2012 | Yamazaki et al. | |

| | | | |
|---|---|---|---|
| 2012/0328956 A1 | 12/2012 | Oguni et al. | |
| 2013/0149605 A1 | 6/2013 | Kakehata et al. | |
| 2015/0151973 A1 | 6/2015 | Lee et al. | |

FOREIGN PATENT DOCUMENTS

| | | | |
|---|---|---|---|
| JP | 2002-008657 A | 1/2002 | |
| JP | 2003-197189 A | 7/2003 | |
| JP | 2005-056645 A | 3/2005 | |
| JP | 2006-265751 A | 10/2006 | |
| JP | 2007-103382 A | 4/2007 | |
| JP | 2009-524567 | 7/2009 | |
| JP | 2009-176721 A | 8/2009 | |
| JP | 2010-009980 A | 1/2010 | |
| JP | 2011-503804 | 1/2011 | |
| JP | 2011-048992 A | 3/2011 | |
| JP | 2011-517053 | 5/2011 | |
| WO | WO-2006/062947 | 6/2006 | |
| WO | WO-2007/061945 | 5/2007 | |
| WO | WO-2009/061685 | 5/2009 | |
| WO | WO-2009/127901 | 10/2009 | |
| WO | WO-2009/144600 | 12/2009 | |
| WO | WO-2011/040022 | 4/2011 | |

OTHER PUBLICATIONS

Zhao.X et al., "In-Plane Vacancy-Enabled High-Power Si-Graphene Composite Electrode for Lithium-Ion Batteries", Advanced Energy Materials, 2011, vol. 1, pp. 1079-1084.

Su.F et al., "Flexible and planar graphene conductive additives for lithium-ion batteries", J. Mater. Chem. (Journal of Materials Chemistry), 2010, vol. 20, pp. 9644-9650.

Zhou.X et al., "Graphene modified LiFePO4 cathode materials for high power lithium ion batteries", J. Mater. Chem. (Journal of Materials Chemistry), 2011, vol. 21, pp. 3353-3358.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Lithium-ion Battery:Application and Practice(Chinese Edition), 1936, pp. 54-55,64, Chemical Industry Press.

Yuping.W, "Lithium Ion Battery", 2004, Chemical Industry Press.

Sundaram.R et al., "Electrochemical Modification of Graphene", Adv. Mater. (Advanced Materials), Jul. 7, 2008, vol. 20, No. 16, pp. 3050-3053.

\* cited by examiner

370

372

371

380

382

381

660

660

SECONDARY BATTERY

BACKGROUND OF THE INVENTION

1. Field of the Invention

The present invention relates to a secondary battery.

2. Description of the Related Art

In recent years, portable electronic devices such as cell phones, smartphones, electronic book (e-book) readers, and portable game machines have come into wide use. Being used as power sources for driving these devices, nonaqueous secondary batteries typified by lithium secondary batteries have been researched and developed actively. Secondary batteries are of growing importance in a variety of uses; for example, hybrid electric vehicles and electric vehicles receive attention because of an increased interest in global environmental problems and an oil resources problem.

For a negative electrode of a lithium secondary battery, a typical example of secondary batteries, graphite that is crystalline carbon has been widely used because of its high theoretical capacity of 372 mAh/g, high efficiency, and excellent cycle performance.

Graphite is a layered compound in which a plurality of graphene layers is stacked in parallel to each other by van der Waals forces. When a secondary battery using such a graphite material for a negative electrode active material is charged, lithium is inserted between the plurality of graphene layers to form a lithium-graphite intercalation compound, and lithium is occluded (intercalated) between the graphene layers. This suppresses formation of a dendrite which presents problems when metallic lithium is used as an active material. On the other hand, lithium is released (deintercalated) when the secondary battery is discharged. In such a manner, charge/discharge reaction of the secondary battery occurs.

A surface of the graphite material includes a plane parallel to the graphene layer (also referred to as a basal plane) and a plane where edges of a plurality of graphene layers are provided (also referred to as an edge plane). In the basal plane, one surface of the outmost layer of the graphene layers which compose graphite is exposed. In the edge plane, the edges of the plurality of graphene layers are exposed. At the time of charging and discharging the secondary battery, lithium is inserted and extracted into/from the edge plane of the graphite material and not inserted and extracted into/from the basal plane.

In a secondary battery using a commercially available graphite electrode, for example, graphite powder is used as the graphite material as described in Patent Document 1.

REFERENCE

[Patent Document 1] Japanese Published Patent Application No. 2007-103382

SUMMARY OF THE INVENTION

However, graphite powder is mixed with a binder and a conductive additive to form a negative electrode active material layer, and edge planes of the graphite powder face various directions. For this reason, lithium moving in the direction of an electric field generated between positive and negative electrodes cannot be intercalated between graphene layers of graphite efficiently, which suppresses output characteristics of the secondary battery.

Since the graphite powder has the edge planes facing various directions as described above, the amount of inserted and extracted lithium varies, leading to deterioration of the negative electrode, which is a problem in the reliability of the secondary battery.

The volume ratio or weight ratio of graphite in the negative electrode active material layer is decreased because the graphite powder is used by being mixed with the binder, the conductive additive, and the like as described above; thus, active material density of the negative electrode active material layer is decreased. Further, in the negative electrode active material layer, the graphite powder needs to be impregnated with an electrolyte solution.

Furthermore, on the edge plane including the edges of the plurality of graphene layers, a film called a solid electrolyte interphase is formed at the time of initial charging and lithium is consumed due to the formation of the film, which generates irreversible capacity. In the case where graphite powder obtained by pulverizing graphite into fine particles is particularly used as an active material, quantity of electricity consumed on the formation of the film is increased because of a large specific surface area, resulting in an increase in irreversible capacity. In the case where a plurality of dangling bonds is formed in the edges of the graphene layers, irreversible capacity is further increased.

This film has ion conductivity which allows passage of lithium ions. When the film has electron conductivity, the film and an electrolyte solution cause decomposition reaction which facilitates the formation of the film, resulting in a decrease in discharge capacity and deterioration of a negative electrode.

In view of the above problems, an object of one embodiment of the present invention is to provide a secondary battery in which lithium can be inserted and extracted into/from graphite that is an active material efficiently.

An object of one embodiment of the present invention is to provide a highly reliable secondary battery in which the amount of lithium inserted and extracted into/from graphite that is an active material is prevented from varying.

An object of one embodiment of the present invention is to provide a secondary battery having high output and high capacity by including an active material layer whose active material density is high.

Further, an object of one embodiment of the present invention is to provide a secondary battery in which an active material layer does not need to be impregnated with an electrolyte solution and lithium can be inserted and extracted into/from a surface of the active material layer efficiently.

Furthermore, an object of one embodiment of the present invention is to provide a secondary battery including a highly reliable negative electrode in which defects in edges of a plurality of graphene layers included in an edge plane are reduced.

One embodiment of the present invention is a secondary battery including a negative electrode which includes a current collector and graphite provided over the current collector, and a positive electrode. The graphite includes a plurality of graphene layers. Surfaces of the plurality of graphene layers are provided substantially along the direction of an electric field generated between the positive electrode and the negative electrode.

One embodiment of the present invention is a secondary battery including a negative electrode which includes a current collector and graphite provided over the current collector, and a positive electrode. The graphite includes a plurality of graphene layers. Surfaces of the plurality of graphene layers are provided substantially in parallel to the direction of an electric field generated between the positive electrode and the negative electrode.

One embodiment of the present invention is a secondary battery including a negative electrode which includes a current collector and a plurality of graphite and provided over the current collector and a positive electrode. Each of the plurality of graphite includes a plurality of graphene layers. Surfaces of the plurality of graphene layers are provided substantially along the direction of an electric field generated between the positive electrode and the negative electrode.

One embodiment of the present invention is a secondary battery including a negative electrode which includes a current collector and a plurality of graphite and provided over the current collector and a positive electrode. Each of the plurality of graphite includes a plurality of graphene layers. Surfaces of the plurality of graphene layers are provided substantially in parallel to the direction of an electric field generated between the positive electrode and the negative electrode.

Here, graphite is a layered compound in which a plurality of graphene layers is stacked in parallel to each other by van der Waals forces. Further, the graphene layer is a sheet composed of a hexagonal net pattern of a one-atom thick layer of carbon formed by carbon atoms which are covalently bonded to each other to form $sp^2$ hybrid orbitals and tricoordinate with each other at an angle of 120° in a surface. Note that defects or functional groups may be partly included in the graphene layer.

Graphite occurs naturally in nature (this is referred to as natural graphite). Graphite is classified as vein graphite, flake graphite, amorphous graphite, or the like according to its shape. On the other hand, graphite can be artificially formed although the resulting graphite is of inferior crystallinity in general. For example, pyrolytic graphite is subjected to heat treatment at a high temperature around 3000° C., whereby graphite can be obtained. This is referred to as artificial graphite. As artificial graphite, mesophase spherules, pitch based carbon fibers, pitch cokes, or the like can be given.

In one embodiment of the present invention, a plurality of graphene layers included in such graphite has surfaces provided substantially along or in parallel to the direction of an electric field generated between positive and negative electrodes. Since the surfaces of the plurality of graphene layers are stacked in parallel to each other, a gap between the graphene layers where lithium is intercalated is aligned with the direction of entry of lithium by providing the graphene layers substantially along the direction of the electric field; thus, lithium can be efficiently occluded between the graphene layers.

Further, one embodiment of the present invention is a secondary battery in which edges of the graphene layers are each terminated by one or more of —O—Si, —O—P, —O-M (M is a metal), —Si, —P, and -M (M is a metal).

One embodiment of the present invention is a secondary battery in which edges of the graphene layers each have a structure of one or more of C—O—Si, C—O—P, C—O-M (M is a metal), C—Si, C—P, and C-M (M is a metal).

Further, each of the edges of the plurality of graphene layers can be chemically stable by terminating each of dangling bonds formed in the edges of the graphene layers by one or more of —O—Si, —O—P, —O-M (M is a metal), —Si, —P, and -M (M is a metal).

One embodiment of the present invention makes it possible to provide a secondary battery in which lithium can be inserted and extracted into/from graphite that is an active material efficiently.

One embodiment of the present invention makes it possible to provide a highly reliable secondary battery in which the amount of lithium inserted and extracted into/from graphite that is an active material is prevented from varying.

One embodiment of the present invention makes it possible to provide a secondary battery having high output and high capacity by including an active material layer whose active material density is high.

One embodiment of the present invention makes it possible to provide a secondary battery including a highly reliable negative electrode in which defects in edges of a plurality of graphene layers included in an edge plane are reduced.

One embodiment of the present invention makes it possible to provide a secondary battery in which an active material layer does not need to be impregnated with an electrolyte solution and lithium can be inserted and extracted into/from a surface of the active material layer efficiently.

DETAILED DESCRIPTION OF THE INVENTION

Embodiments and an example are described below with reference to drawings. However, the embodiments and the example can be implemented with various modes. It will be readily appreciated by those skilled in the art that modes and details can be changed in various ways without departing from the spirit and scope of the present invention. Thus, the present invention should not be interpreted as being limited to the following description of the embodiments and the example.

Embodiment 1

In this embodiment, a secondary battery of one embodiment of the present invention is described with reference to FIGS. 1A to 1C and FIGS. 2A and 2B.

Figure 1A:
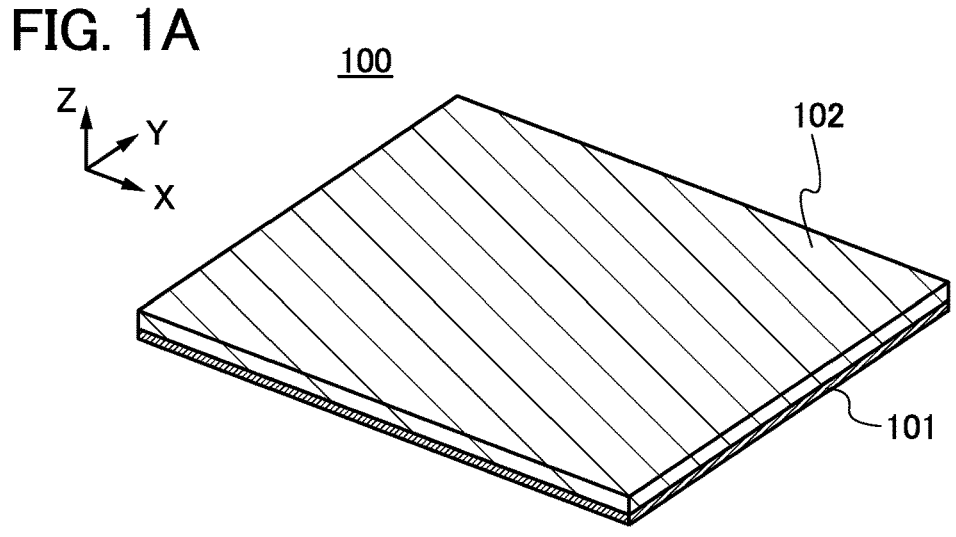
FIGS. 1A to 1C illustrate a negative electrode.

FIG. 1A is a perspective view of a negative electrode. A negative electrode 100 has a structure in which an active material layer 102 is provided over a current collector 101.

Note that although the active material layer 102 is provided on one surface of the current collector 101 in FIG. 1A, the active material layer 102 may be provided on both surfaces of the current collector 101.

The current collector 101 can be formed using a material which has high conductivity and is not alloyed with carrier ions such as lithium ions, e.g., a metal typified by stainless steel, gold, platinum, zinc, iron, copper, aluminum, titanium, or tantalum, or an alloy thereof. Alternatively, the current collector 101 can be formed using an aluminum alloy to which an element which improves heat resistance, such as silicon, titanium, neodymium, scandium, or molybdenum, is added. Further alternatively, the current collector 101 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The current collector 101 can have a foil-like shape, a plate-like shape (sheet-like shape), a net-like shape, a cylindrical shape, a coil shape, a punching-metal shape, an expanded-metal shape, or the like, as appropriate. The current collector 101 preferably has a thickness of more than or equal to 10 μm and less than or equal to 30 μm.

As illustrated in FIG. 1A, the active material layer 102 is provided over the current collector 101. In one embodiment of the present invention, graphite that is a crystalline carbon material is used as the active material layer 102. As graphite, natural graphite such as vein graphite, flake graphite, or amorphous graphite, or artificial graphite such as mesophase spherules, pitch-based carbon fibers, pitch cokes, kish graphite, or highly oriented pyrolytic graphite (HOPG) can be used.

Figure 1B:
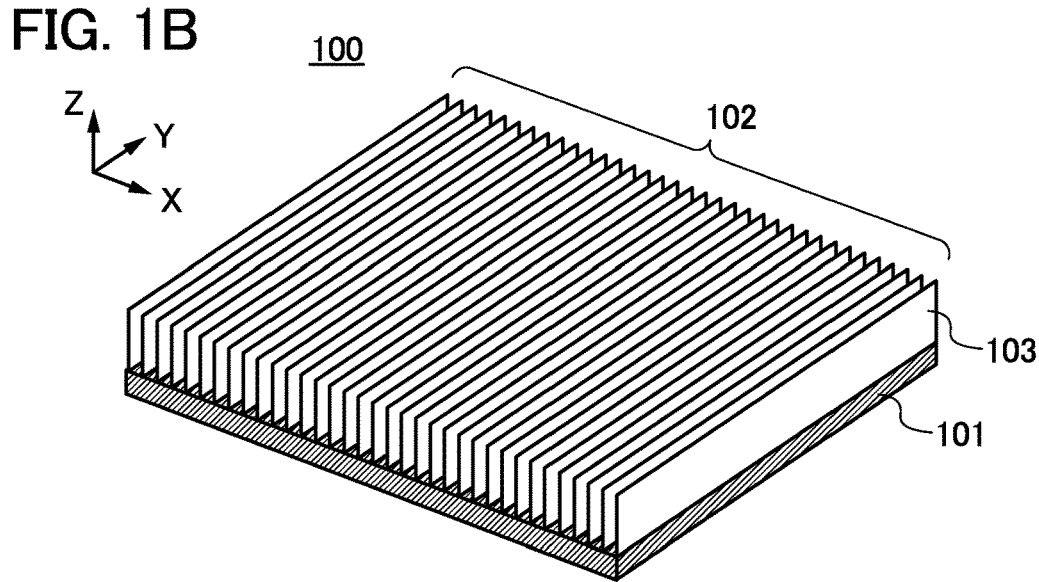
Figure 1C:
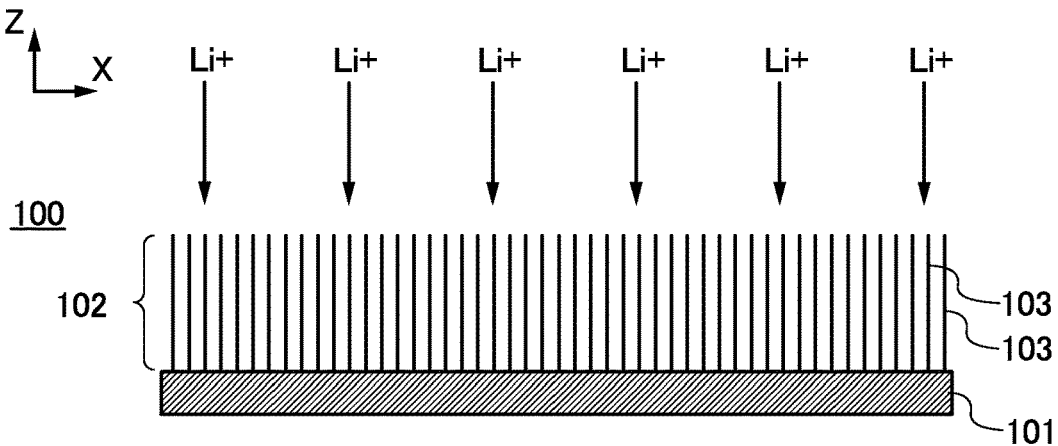

FIG. 1B is an enlarged view of part of the negative electrode 100 in FIG. 1A. FIG. 1C is a cross-sectional view of the negative electrode 100 in the thickness direction. A plurality of graphene layers 103 is included in the graphite provided as the active material layer 102. Graphite is a layered compound in which the plurality of graphene layers 103 is stacked in parallel to each other by van der Waals forces. In one embodiment of the present invention, surfaces of the plurality of graphene layers 103 are provided substantially along or in parallel to the direction of an electric field generated between a positive electrode and the negative electrode as described later. In other words, the direction of this electric field is substantially parallel to the shortest possible line of straight lines between the positive electrode and the negative electrode. Note that "a surface of a graphene layer is substantially along or in parallel to the direction of an electric field" means that the angle between the direction of the electric field and the surface of the graphene layer ranges from −20° to 20°, for example.

Note that in FIG. 1C, a schematic diagram of one embodiment of the present invention, a surface formed by edges of the plurality of graphene layers 103 (a surface of an aggregate of the edges) as a surface of the active material layer 102 is parallel to a top surface of the current collector 101 and perpendicular to the direction of the electric field. Note that the surface of the current collector 101 is not necessarily flat, and has unevenness in some cases. It is sufficient that surfaces of the plurality of graphene layers are substantially parallel to the direction of the electric field even when the surface of the current collector 101 has unevenness. In the edge plane, positions of the edges of the graphene layers 103 are not necessarily aligned. The edge plane may have a step-like form, and the surfaces of the plurality of graphene layers may be at least substantially parallel to the direction of the electric field.

Lithium can be inserted into the active material layer 102 efficiently by providing the graphene layers 103 included in the graphite substantially along or in parallel to the direction of the electric field in such a manner. Since every point of the surface of the active material layer 102 includes the edge of the graphene layer 103, lithium is uniformly inserted between the graphene layers, so that there is no variation in the concentration of lithium in the whole area of the active material layer. Thus, the reliability of the negative electrode can be improved. In addition, the active material layer 102 illustrated in FIGS. 1A to 1C is a single crystal film in which the plurality of graphene layers 103 is provided in the same direction. Accordingly, the active material layer 102 includes graphite only, and therefore can be used for a negative electrode with high density in a secondary battery.

Figure 2A:
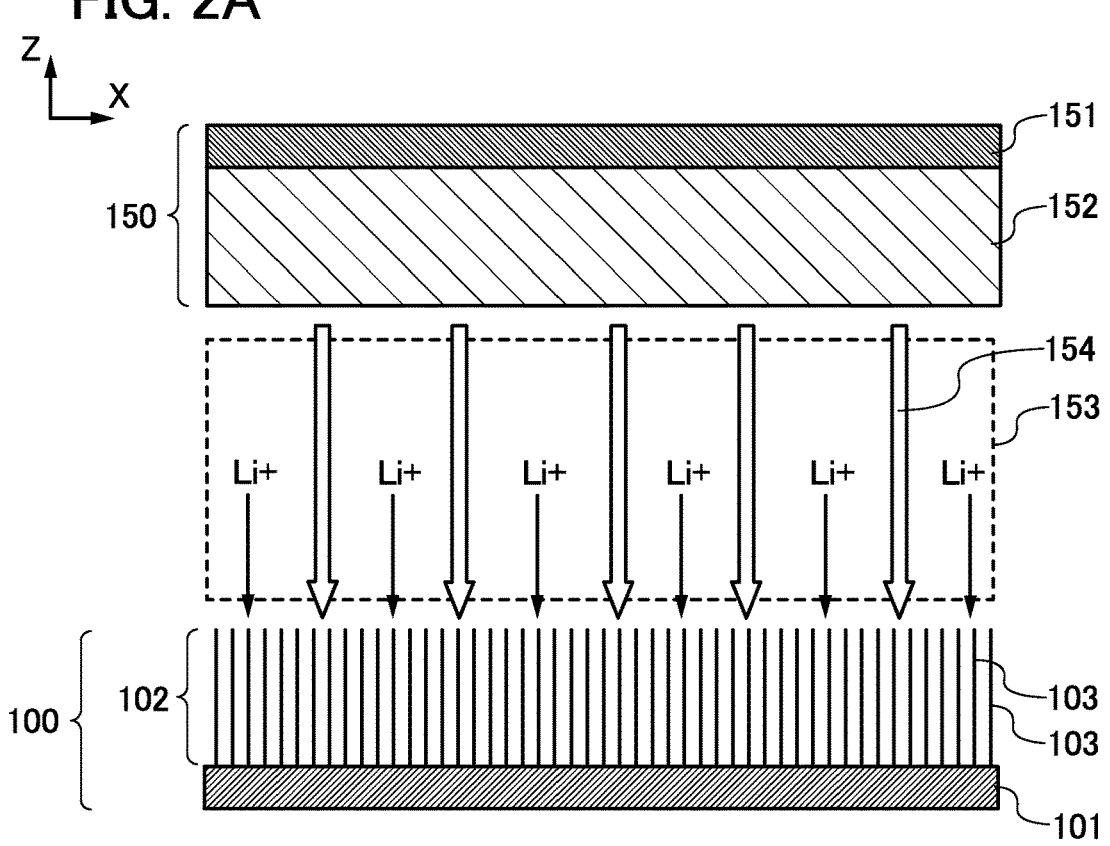
FIGS. 2A and 2B illustrate insertion of lithium into a negative electrode.

FIG. 2A is a schematic diagram of a secondary battery of one embodiment of the present invention including the negative electrode 100 illustrated in FIG. 1C. A positive electrode 150 is provided to face the negative electrode 100. The positive electrode 150 includes a current collector 151 and an active material layer 152 provided over the current collector 151 (under the current collector 151 in FIG. 2A). A porous separator 153 which is shown by a dotted frame is provided between the positive electrode 150 and the negative electrode 100, and an electrolyte solution (not illustrated) fills pores of the separator 153. When the secondary battery is charged, a voltage is applied from the positive electrode 150 to the negative electrode 100 and an electric field 154 is generated. Accordingly, lithium in an electrolyte contained in the electrolyte solution, such as $LiPF_6$, moves. After reaching the negative electrode 100, lithium is inserted into a gap between the graphene layers 103. Lithium is occluded into the active material layer 102 by forming a lithium-graphite intercalation compound in the gap between the plurality of graphene layers 103.

Figure 2B:
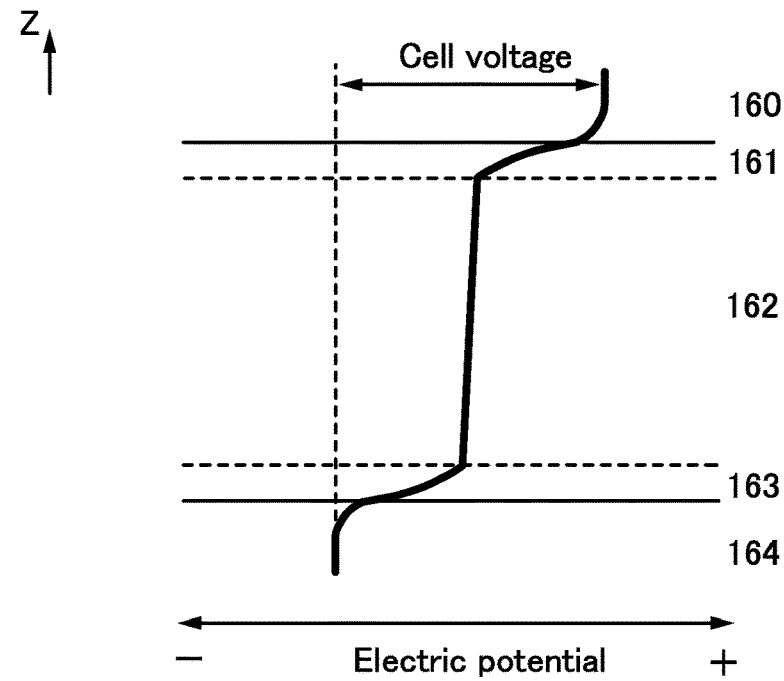

FIG. 2B is a schematic diagram of electric potential distribution between positive and negative electrodes. There is a gradient of the electric potential from a positive electrode 160 to a negative electrode 164. A potential difference between the positive electrode 160 and the negative electrode 164 is a cell voltage. Although the electric potential changes little in a region between the positive electrode 160 and the negative electrode 164 which is filled with an electrolyte solution 162, an electric double layer 161 and an electric double layer 163 are formed at the interface between the electrolyte solution 162 and the positive electrode 160 and the interface between the electrolyte solution 162 and the negative electrode 164, respectively, and the potential difference is generated. Consequently, a strong electric field is generated particularly at the interface between the electrode and the electrolyte solution.

The plurality of graphene layers 103 provided substantially along or in parallel to such an electric field allows efficient insertion and extraction of lithium.

Further, as illustrated in FIG. 2B, electric potential distribution is seen inside the positive electrode 160 and the negative electrode 164 in some cases. A potential difference generated inside an electrode is due to ohmic loss or the like. In that case, lithium which is inserted into the active material layer 102 further moves along the direction of the electric field in the electrode, and moves into a deep portion of the gap between the graphene layers by diffusing and being influenced by the electric field. At this time, the surfaces of the plurality of graphene layers are provided substantially along or in parallel to the direction of the electric field, which promotes intercalation of lithium.

The above-described structure of the negative electrode 100 can be obtained by forming HOPG or kish graphite over the current collector 101 with the direction of its edge plane adjusted as appropriate, for example.

Next, the above-described structure of a negative electrode including graphite in which a plurality of graphene layers is provided substantially along or in parallel to an electric field is described with reference to FIGS. 3A and 3B, FIGS. 4A and 4B, FIGS. 5A and 5B, and FIG. 6.

Figure 3A:
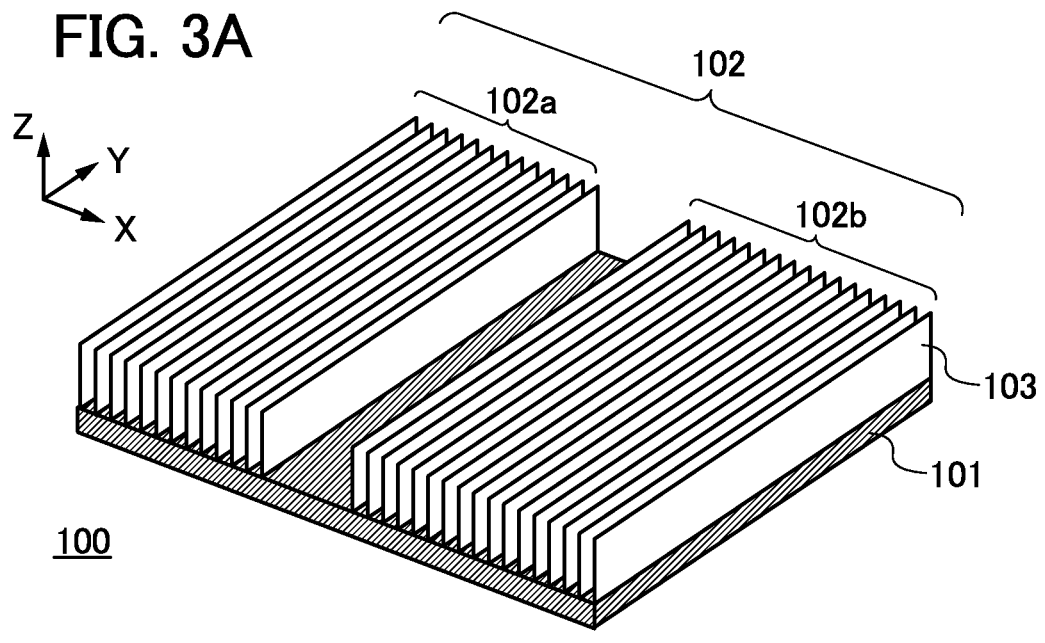
FIGS. 3A and 3B illustrate negative electrodes.

FIGS. 1A to 1C illustrate the graphite in a film form in which the graphene layers are oriented over the current collector 101. This is an example of single crystal graphite. On the other hand, FIGS. 3A and 3B each illustrate the negative electrode 100 in which as the active material layer 102, a plurality of active materials is provided over the current collector 101. In FIG. 3A, as the active material layer 102, two active materials 102*a* and 102*b* are provided over the current collector 101, for example. The number of active materials may be more than two. In the example in FIG. 3A, when a direction connecting a positive electrode and the negative electrode is a Z axis, surfaces of the graphene layers 103 in the two active materials 102*a* and 102*b* are substantially parallel to the Z-axis direction, and the surfaces of the graphene layers in different active materials are provided in the same direction (i.e., in parallel to each other).

Figure 3B:
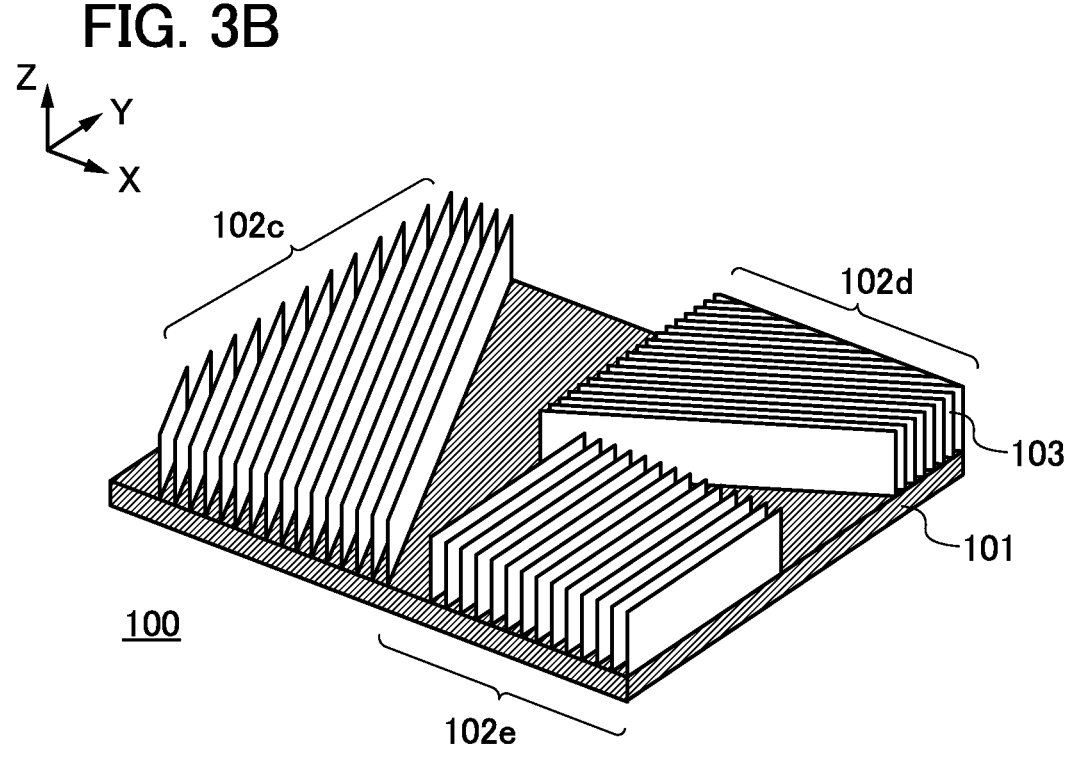

In FIG. 3B, the active material layer 102 includes a plurality of active materials 102*c*, 102*d*, and 102*e*. Surfaces of the graphene layers 103 included in different active materials are provided in different directions. That is, when a direction connecting the positive electrode and the negative electrode is the Z axis, although the surfaces of the graphene layers 103 are substantially parallel to the Z-axis direction, the surfaces are not necessarily parallel to an X-axis direction and a Y-axis direction, which are orthogonal to the Z axis-direction.

As described above, a plurality of active materials may be provided over the current collector 101. This makes it possible to fabricate a negative electrode showing the same effect even when it is difficult to form single crystal graphite in a large size. In the case of providing a plurality of active materials over the current collector 101, the plurality of active materials may be dotted at random as illustrated in FIG. 3B, or may be spread all over the current collector 101 with their directions controlled. In any case, it is important to provide the active materials so that the surfaces of the graphene layers are substantially along or parallel to the direction of the electric field.

Note that although not illustrated, when a plurality of active materials is provided over the current collector 101, a conductive additive or a binder may be provided to fill spaces between the plurality of active materials. In the case of providing the conductive additive, an electron conducting path is formed between the active materials, so that electric potentials are uniform at any point in the negative electrode 100, which enables variations in deterioration of the negative electrode to be reduced. In the case of providing the binder, separation of the active material caused by expansion and contraction of the active material due to charging and discharging of a secondary battery can be suppressed, leading to an improvement in the reliability of the negative electrode.

As the conductive additive, carbon particles such as acetylene black particles, ketjen black particles, or carbon nanofibers can be used. Further, graphene obtained by reducing graphene oxide, which is separated from graphite by a synthesis method such as a Hummers method, through heat treatment, electrochemical treatment, chemical treatment, or the like can also be used as the conductive additive.

As the binder, instead of polyvinylidene fluoride (PVDF) as a typical one, polyimide, polytetrafluoroethylene, polyvinyl chloride, an ethylene-propylene-diene polymer, butadiene rubber, styrene-butadiene rubber, butyl rubber, acrylonitrile-butadiene rubber, fluorine rubber, polyvinyl acetate, polymethyl methacrylate, polyethylene, polypropylene, nitrocellulose, or the like can be used.

Next, examples of a negative electrode with a structure including a stack of active materials each of which is the active material illustrated in FIG. 1B are described with reference to FIGS. 4A and 4B, FIGS. 5A and 5B, and FIG. 6.

Figure 4A:
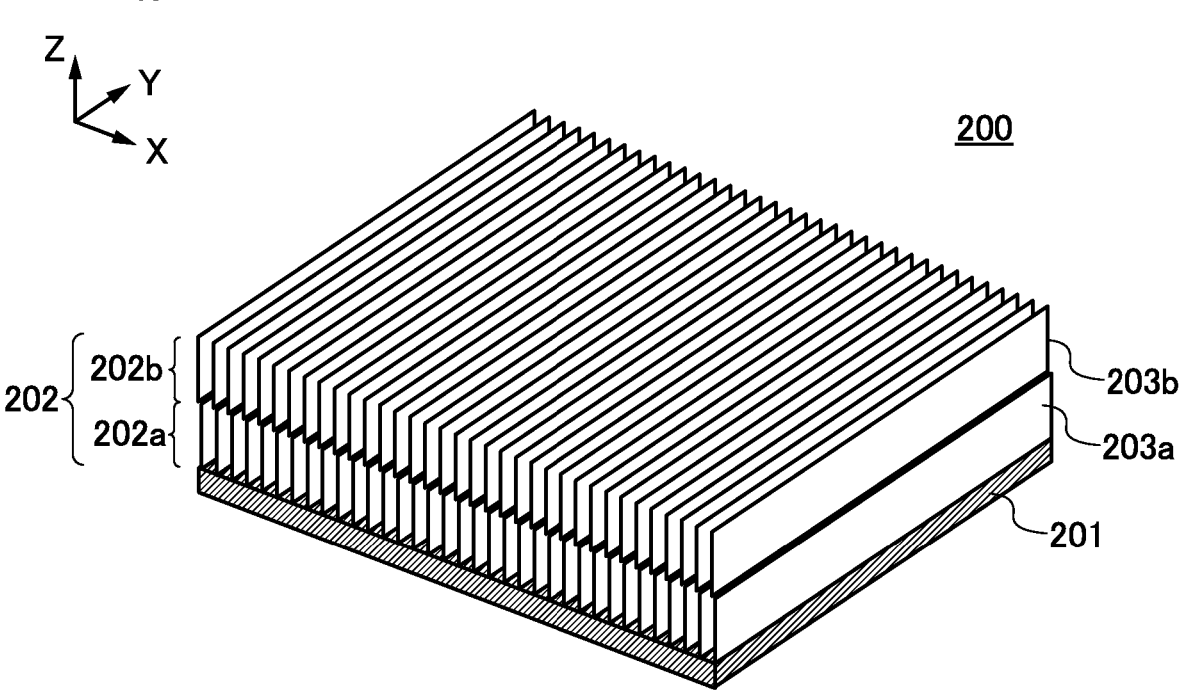
FIGS. 4A and 4B illustrate a negative electrode.
Figure 4B:
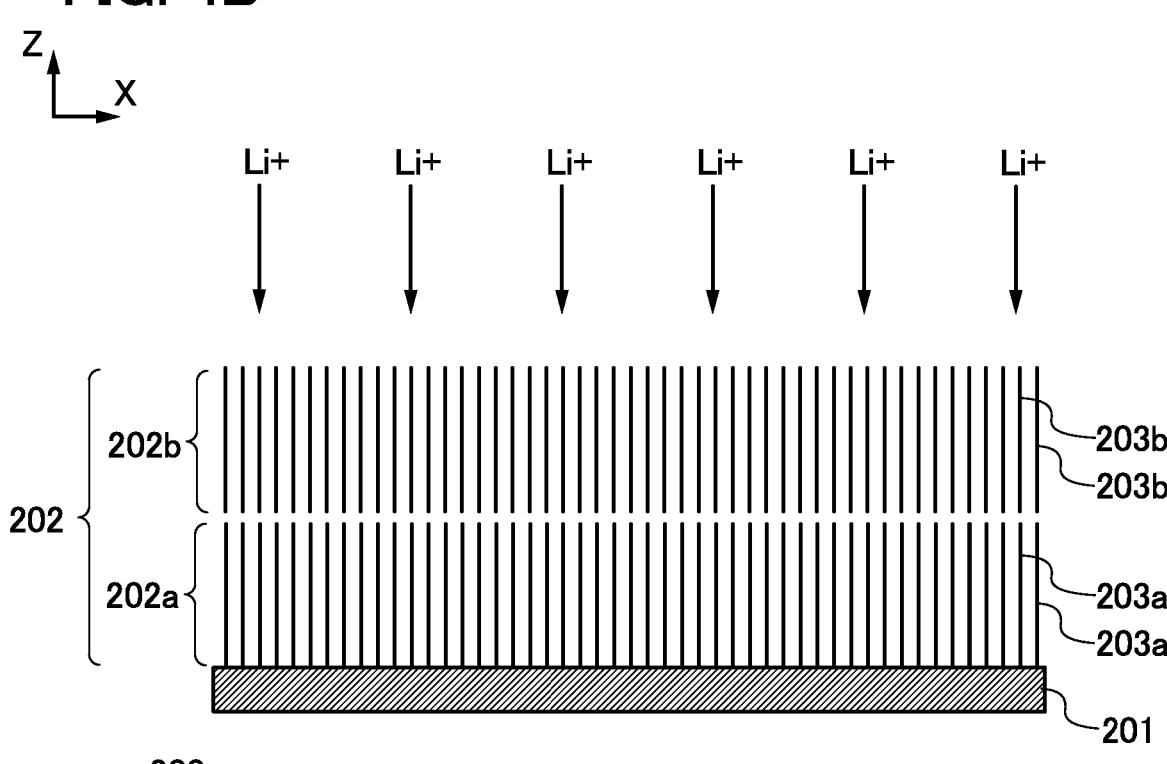

In a negative electrode 200 illustrated in FIGS. 4A and 4B, an active material layer 202 provided over a current collector 201 includes a stack of an active material 202*a* and an active material 202*b*. The active material 202*a* is graphite including a plurality of graphene layers 203*a* and the active material 202*b* is graphite including a plurality of graphene layers 203*b*. Surfaces of the plurality of graphene layers 203*a* included in the active material 202*a* and surfaces of the plurality of graphene layers 203*b* included in the active material 202*b* are provided substantially along or in parallel to the direction of the electric field. In the negative electrode 200, the surfaces of the plurality of graphene layers 203*a* included in the active material 202*a* and the surfaces of the plurality of graphene layers 203*b* included in the active material 202*b* face the same direction (the X-axis direction in FIG. 4A). Consequently, the directions of gaps between the plurality of graphene layers in the active material 202*a* and the directions of gaps between the plurality of graphene layers in the active material 202*b* are oriented. The graphene layers 203*a* and 203*b* provided in such a manner enable lithium to be inserted into a gap between the graphene layers efficiently and to be further inserted into a deep portion of the gap.

Although the two active materials are stacked in FIGS. 4A and 4B, the number of stacked active materials is not limited to two and may be three or more. The thicknesses of the active materials may each be determined depending on a depth at which lithium can be inserted into the active material. For example, the total thickness of a stack of the active materials (i.e., the thickness of the active material layer) is preferably more than or equal to 5 μm and less than or equal to 1 mm. The active materials stacked in such a manner enable the thickness of the active material layer to be increased. In graphite, a diffusion rate of lithium is higher than that in other active materials; therefore, the active material layer can operate as a negative electrode.

Figure 5A:
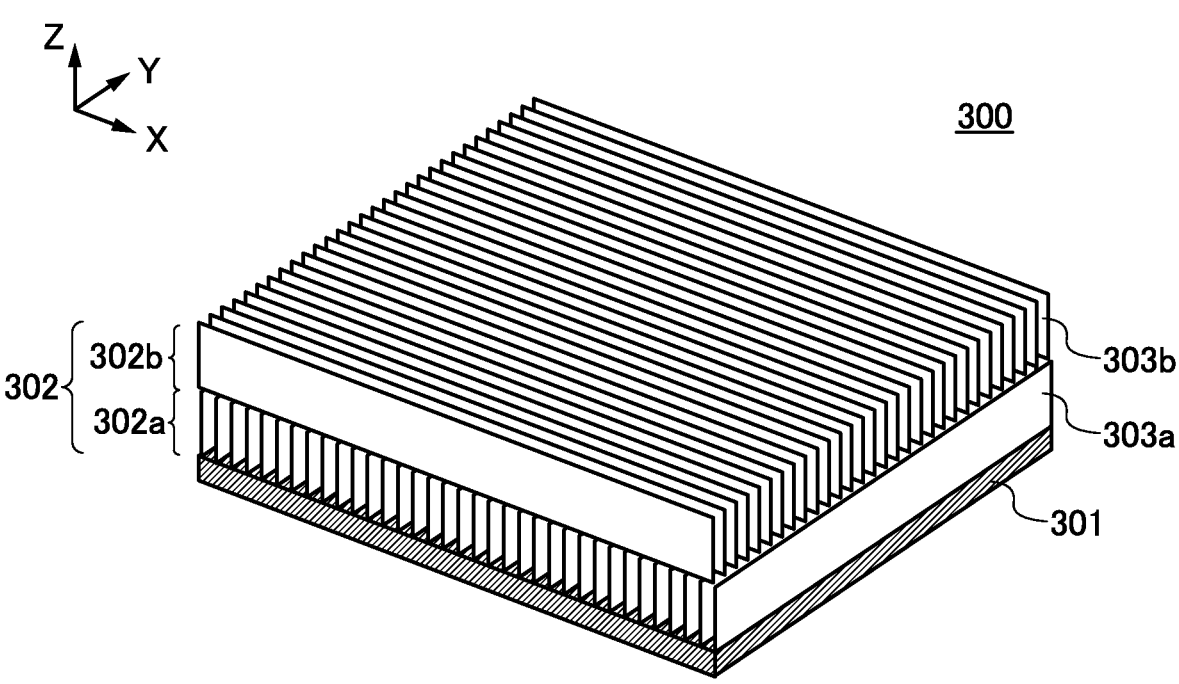
FIGS. 5A and 5B illustrate a negative electrode.
Figure 5B:
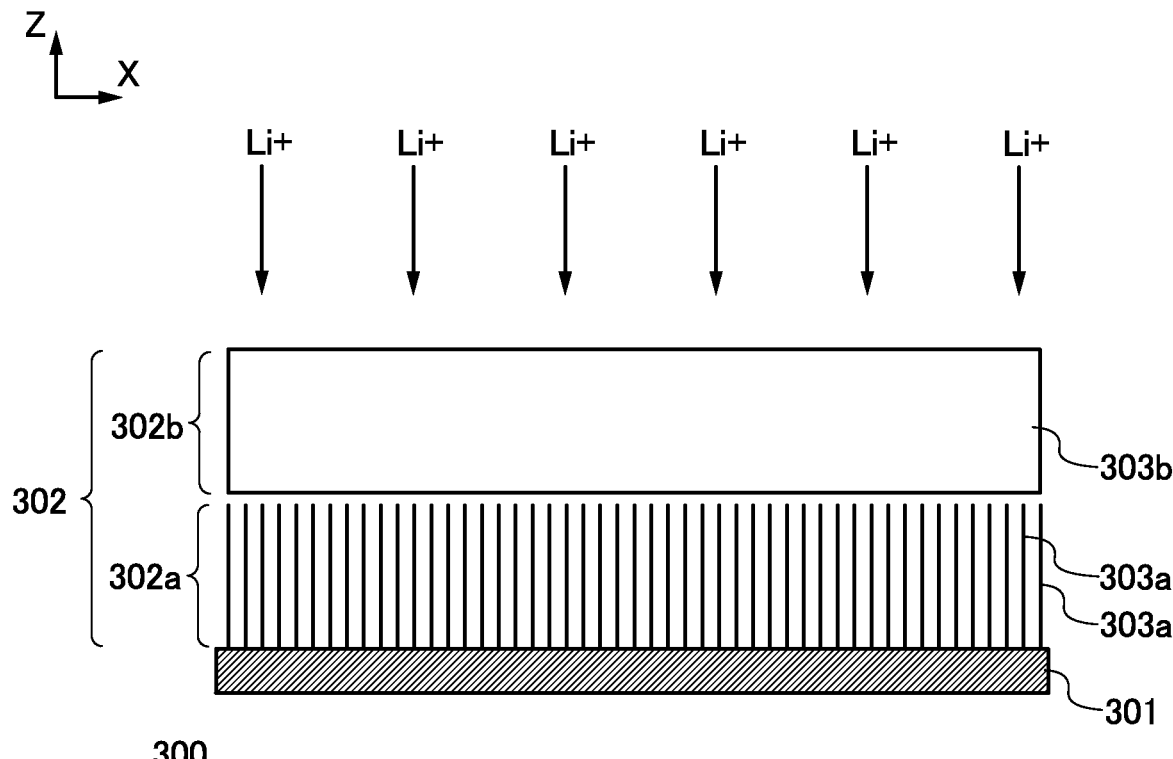

In a negative electrode 300 illustrated in FIGS. 5A and 5B, which has a stack of active materials as in the negative electrode 200 illustrated in FIGS. 4A and 4B, the active materials have different arrangements of graphene layers. That is, an active material layer 302 of the negative electrode 300 includes an active material 302*a* provided over a current collector 301 and an active material 302*b* stacked over the active material 302*a*. Surfaces of a plurality of graphene layers 303*a* included in the active material 302*a* and surfaces of a plurality of graphene layers 303*b* included in the active material 302*b* are both substantially parallel to the Z-axis direction (the direction of the electric field), and the surfaces of the graphene layers 303*a* and the surfaces of the graphene layers 303*b* are provided orthogonal to the X-axis direction and the Y-axis direction, respectively.

In such a stacked structure, the surfaces of the graphene layers included in each of the active materials are substantially parallel to the direction of the electric field, which enables lithium to be inserted into the active material efficiently. Note that although the surfaces of the graphene layers included in one of the active materials are orthogonal to the surfaces of the graphene layers included in the other active material in FIGS. 5A and 5B, the arrangements of the surfaces of the graphene layers are not limited thereto, and the active materials may be stacked so that the surfaces of the graphene layers make a given angle with each other.

Figure 6:
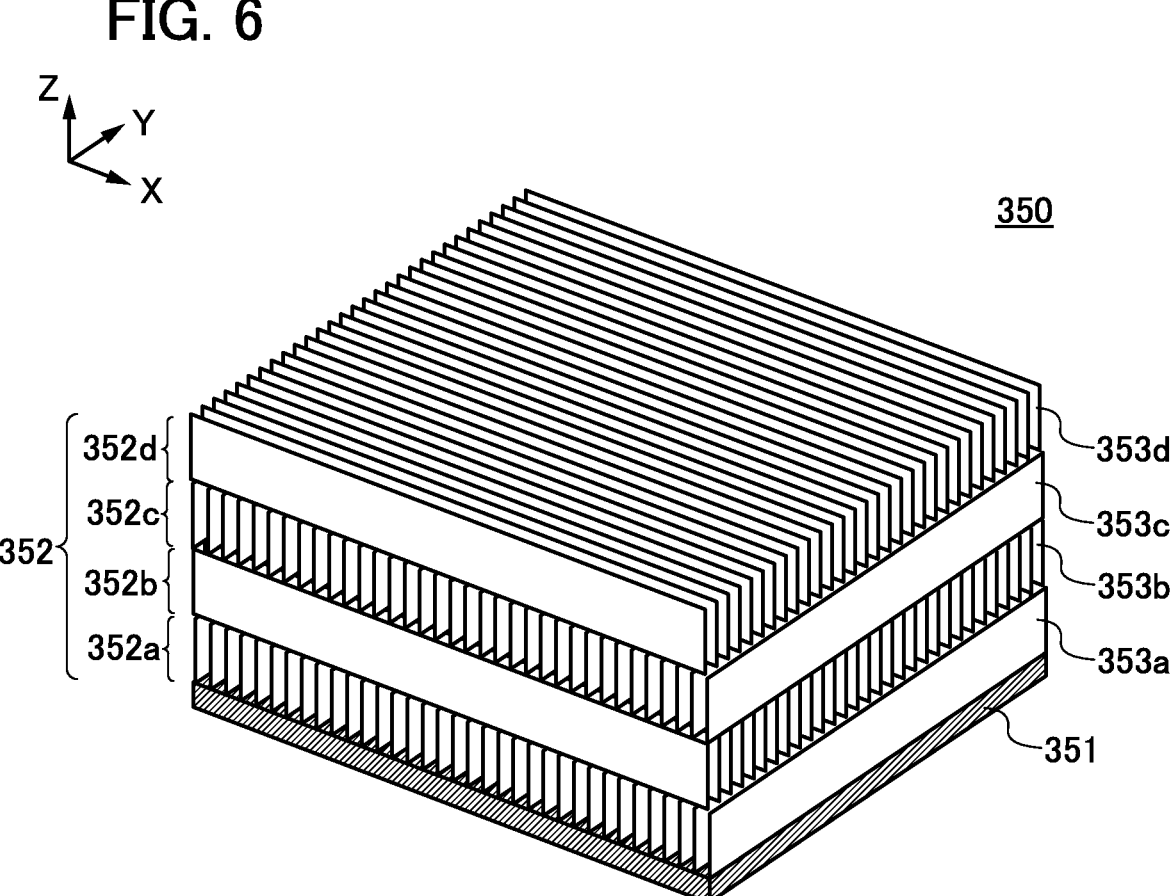
FIG. 6 illustrates a negative electrode.

FIG. 6 illustrates a negative electrode 350 including active materials the number of which is larger than that of those in the negative electrode 300 illustrated in FIGS. 5A and 5B. That is, the negative electrode 350 includes an active material layer 352 over a current collector 351; the active material layer 352 includes active materials 352a, 352b, 352c, and 352d which are stacked. Surfaces of pluralities of graphene layers 353a and 353c which are included in the active materials 352a and 352c, respectively, and surfaces of pluralities of graphene layers 353b and 353d which are included in the active materials 352b and 352d, respectively are both substantially parallel to the Z-axis direction (the direction of the electric field). The surfaces of the pluralities of graphene layers 353a and 353c are provided orthogonal to the X-axis direction and the surfaces of the pluralities of graphene layers 353b and 353d are provided orthogonal to the Y-axis direction.

In such a stacked structure, the surfaces of the graphene layers included in each of the active materials are substantially parallel to the direction of the electric field, which enables lithium to be inserted into the active material efficiently. Note that although the surfaces of the graphene layers which are included in the active materials in contact with each other in a vertical direction are provided orthogonal to each other in FIG. 6, the arrangements of the surfaces of the graphene layers are not limited thereto, and the active materials may be stacked so that the surfaces of the graphene layers make a given angle with each other.

Figure 7A:
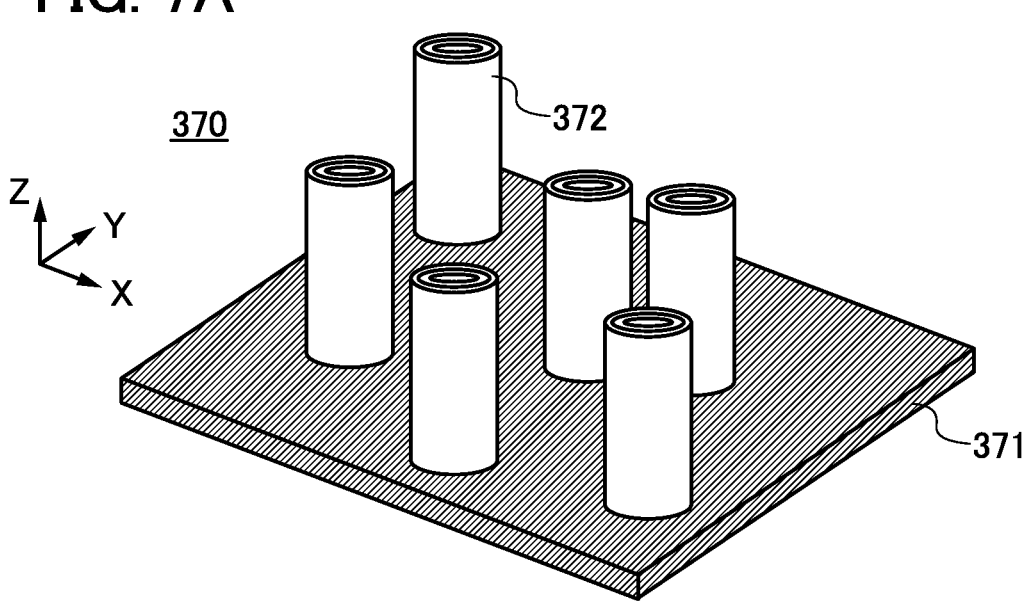
FIGS. 7A and 7B illustrate negative electrodes.
Figure 7B:
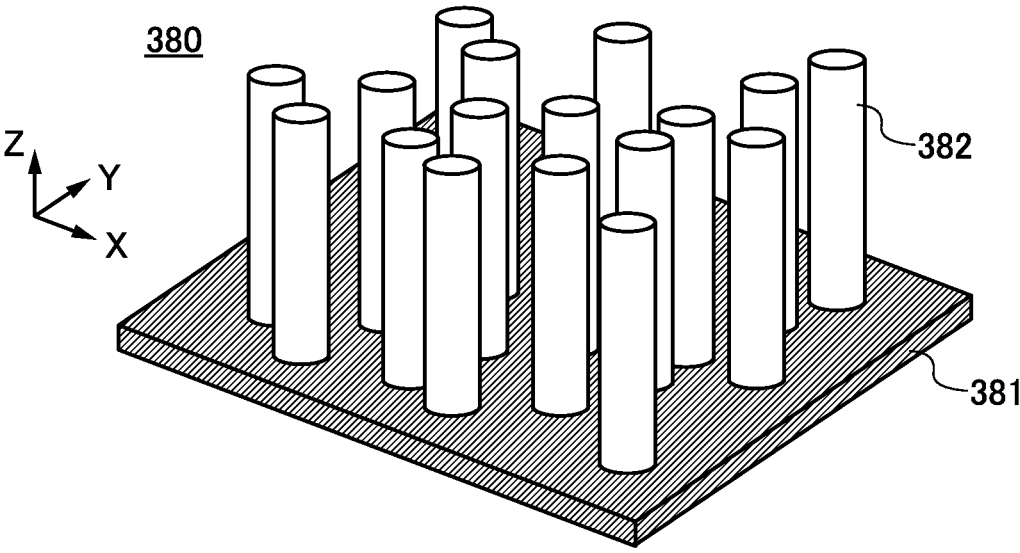

FIGS. 7A and 7B each illustrate a negative electrode in which cylindrical graphite is used for an active material. FIG. 7A illustrates a negative electrode 370 in which carbon fibers each having an onion-like structure are used for active materials 372 over a current collector 371. In the onion-like structure, edges of a plurality of graphene layers form concentric circles around the central axis of a cylinder. The edges of the plurality of graphene layers are positioned at a top surface in each of the cylinders. The cylindrical active materials 372 are provided so that the central axes thereof are orthogonal to a surface of the current collector 371. FIG. 7B illustrates a negative electrode 380 in which carbon nanotubes are used for active materials 382 provided over a current collector 381. A carbon nanotube is a carbon material that is a coaxial tube formed of a single layer or a multilayer of graphene. Thus, surfaces of the graphene layers formed as coaxial tubes can be provided substantially along or in parallel to the direction of the electric field by providing the carbon nanotubes so that the central axes thereof are orthogonal to a surface of the current collector 381. Note that the densities of the active materials 372 and 382 can be adjusted as appropriate depending on the specification of a secondary battery to be manufactured.

As described above, surfaces of a plurality of graphene layers included in an active material are provided substantially along or in parallel to the direction of an electric field, which enables graphite that is the active material to occlude and release lithium efficiently. Further, it is possible to prevent the amount of lithium inserted and extracted into/from graphite that is the active material from varying. Furthermore, with the use of an active material layer whose active material density is high, a secondary battery with high output and high capacity can be manufactured.

This embodiment can be implemented in combination with any of the other embodiments as appropriate.

Embodiment 2

In this embodiment, termination of edges of a plurality of graphene layers included in graphite that is crystalline carbon is described with reference to FIGS. 8A to 8C.

Figures 8A, 8B, 8C:
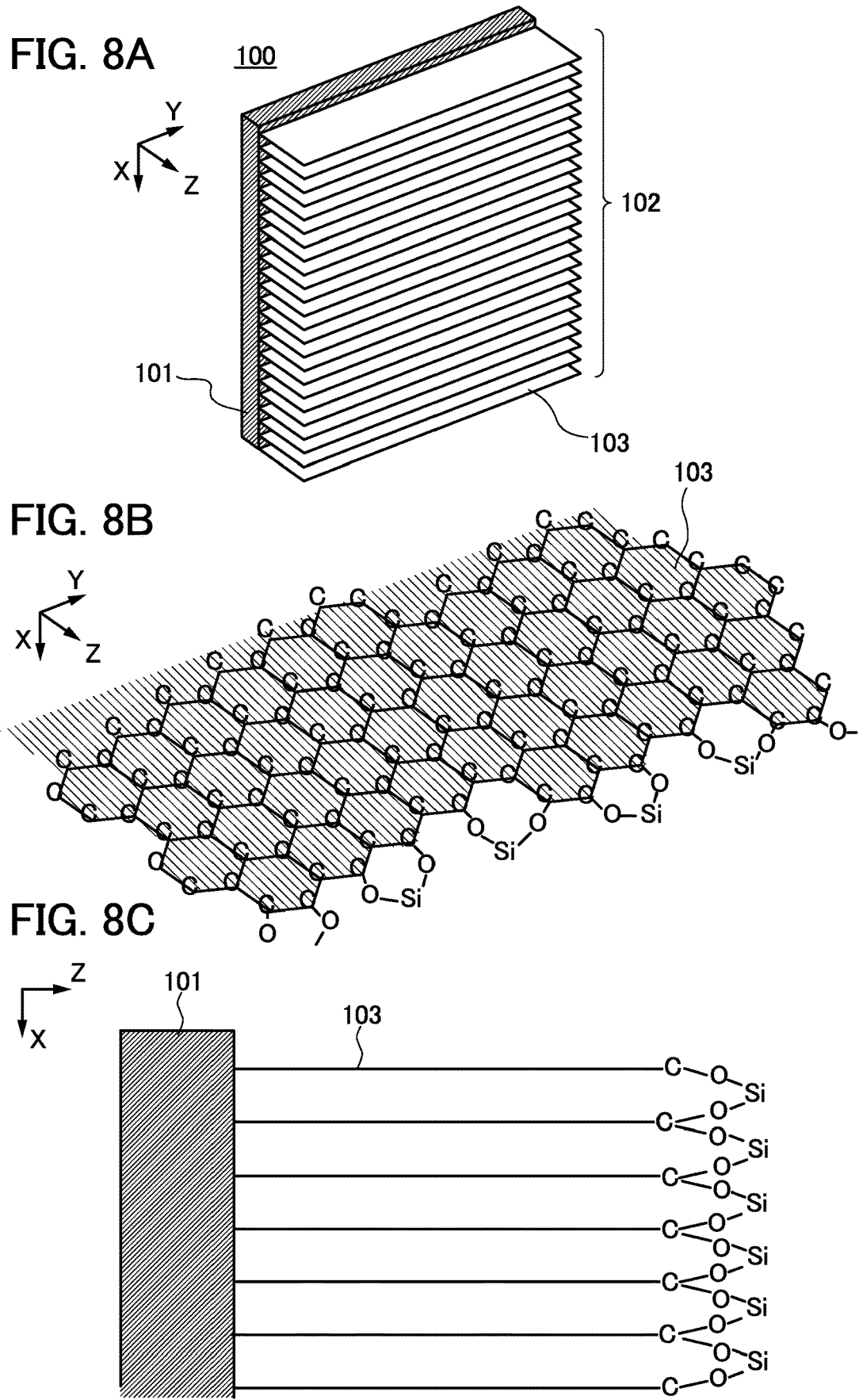
FIGS. 8A to 8C illustrate termination of an edge of a graphene layer.

FIG. 8A illustrates the negative electrode 100 in FIG. 1B described in Embodiment 1. The current collector 101 is illustrated at the back of the drawing and the active material layer 102 is illustrated at the front for convenience. The active material layer 102 includes the plurality of graphene layers 103, and surfaces of the plurality of graphene layers are stacked in parallel to each other.

There are carbon atoms having one or more dangling bonds in edges of the plurality of graphene layers 103 exposed to an electrolyte solution. The dangling bond can be regarded as a defect in the edge of the graphene layer. To deactivate and stabilize the graphene layer having such a dangling bond, the defect is repaired by terminating the dangling bond. Specifically, one or more of groups such as —O—Si, —O—P, —O-M (M is a metal), —Si, —P, and -M (M is a metal) are bonded to terminate the dangling bond.

When the group contains a metal (M), examples of the metal include aluminum (Al), titanium (Ti), vanadium (V), chromium (Cr), manganese (Mn), iron (Fe), cobalt (Co), nickel (Ni), copper (Cu), zinc (Zn), niobium (Nb), molybdenum (Mo), silver (Ag), cadmium (Cd), indium (In), tin (Sn), barium (Ba), hafnium (Hf), tantalum (Ta), tungsten (W), iridium (Ir), platinum (Pt), gold (Au), lead (Pb), lanthanum (La), selenium (Ce), palladium (Pr), an alloy of any of these metals, and the like.

By terminating the edge of the graphene layer, a structure of one or more of C—O—Si, C—O—P, C—O-M (M is a metal), C—Si, C—P, and C-M (M is a metal) are formed in the edge of the graphene layer.

FIGS. 8B and 8C illustrate examples in which the edges of the graphene layers 103 are terminated. FIG. 8B illustrates a state where an edge of the one graphene layer 103 is terminated by —O—Si. As illustrated in the drawing, the edge of the graphene layer can be terminated by one or more of the above-described groups such as —O—Si, —O—P, —O-M (M is a metal), —Si, —P, and -M (M is a metal). By terminating dangling bonds so that adjacent carbon atoms or carbon atoms close to each other are connected in the edge of the one graphene layer as in FIG. 8B, the edge of the graphene layer 103 can be stabilized.

FIG. 8C illustrates a state where edges of the plurality of graphene layers 103 stacked with each other are terminated by —O—Si—O—. As illustrated in the drawing, the edges of the graphene layers 103 can be terminated by one or more of the above-described groups such as —O—Si, —O—P, —O-M (M is a metal), —Si, —P, and -M (M is a metal). By terminating dangling bonds so that adjacent carbon atoms or carbon atoms close to each other are connected as in FIG. 8C, the edges of the graphene layers 103 can be stabilized.

The structure of one or more of C—O—Si, C—O—P, C—O-M (M is a metal), C—Si, C—P, and C-M (M is a metal), which is formed in the edge of the graphene layer by terminating the dangling bonds in the edge of the graphene layer as described above, is formed to have at least a thickness similar to that of a one-atom thick layer or a several-atom thick layer. However, the structure of one or more of C—O—Si, C—O—P, C—O-M (M is a metal), C—Si, C—P, and C-M (M is a metal) may be formed to have a thickness larger than that of the one-atom thick layer or the several-atom thick layer.

An edge plane can be chemically stabilized by terminating the dangling bonds in each of the edges of the plurality of graphene layers and two-dimensionally terminating the dangling bonds in the edges of the plurality of graphene layers. A structure formed by modification of —O—Si or the like, such as C—O—Si, functions as a protective film, which makes it possible to prevent deterioration of graphite due to repeated charge and discharge.

Since a group such as —O—Si has low electric conductivity, decomposition reaction of an electrolyte solution at an interface between the electrolyte solution and an electrode can be prevented. Thus, a film is prevented from being excessively formed, resulting in a decrease in irreversible capacity.

In addition, when the edges of the plurality of graphene layers 103 which are stacked as illustrated in FIG. 8C are terminated by —O—Si—O— or the like, the distance between the graphene layers 103 bonded to —O—Si—O— is less likely to increase. For this reason, it is probable that solvated lithium ions are difficult to be inserted into a gap between the graphene layers. Thus, it is probable that solvated lithium ions are desolvated in a film formed outside a layer of the structure formed by termination, such as C—O—Si, and only lithium ions are inserted into the gap between the graphene layers. This makes it possible to prevent deterioration of graphite.

The edge of the graphene layer can be terminated as described above by a sol-gel method, a plating method such as an electroless plating method, a sputtering method, a CVD method, or the like.

This embodiment can be implemented in combination with any of the other embodiments as appropriate.

Embodiment 3

In this embodiment, a variety of structures of secondary batteries described in Embodiments 1 and 2 are described with reference to FIGS. 9A and 9B and FIGS. 10A and 10B.

(Coin-Type Secondary Battery)

Figure 9A:
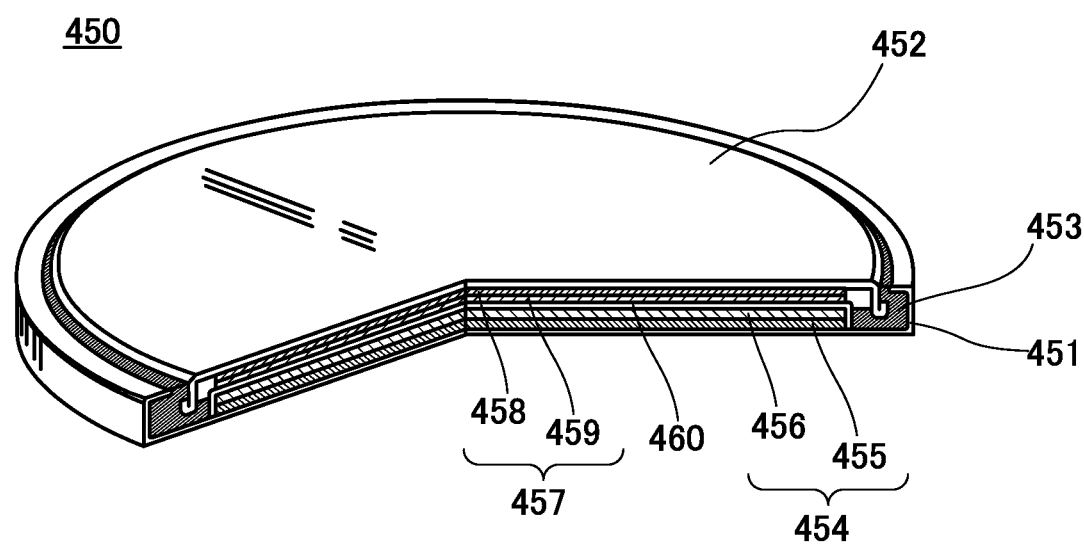
FIGS. 9A and 9B illustrate a coin-type secondary battery and a laminated secondary battery.

FIG. 9A is an external view of a coin-type (single-layer flat type) secondary battery, part of which also illustrates a cross-sectional view of part of the coin-type secondary battery.

In a coin-type secondary battery 450, a positive electrode can 451 serving also as a positive electrode terminal and a negative electrode can 452 serving also as a negative electrode terminal are insulated and sealed with a gasket 453 formed of polypropylene or the like. A positive electrode 454 includes a positive electrode current collector 455 and a positive electrode active material layer 456 which is provided to be in contact with the positive electrode current collector 455. A negative electrode 457 is formed of a negative electrode current collector 458 and a negative electrode active material layer 459 which is provided to be in contact with the negative electrode current collector 458. A separator 460 and an electrolyte solution (not illustrated) are included between the positive electrode active material layer 456 and the negative electrode active material layer 459.

As the negative electrode 457, any of the negative electrodes 100, 200, 300, and 350 described in the above embodiments is used.

As the positive electrode 454, any of a variety of known positive electrodes can be used. For example, the positive electrode 454 may include the positive electrode current collector 455 and the positive electrode active material layer 456 provided thereover.

The positive electrode current collector 455 can be formed using a highly conductive material such as a metal typified by stainless steel, gold, platinum, zinc, iron, copper, aluminum, or titanium, or an alloy thereof. Note that the positive electrode current collector 455 can be formed using an aluminum alloy to which an element which improves heat resistance, such as silicon, titanium, neodymium, scandium, or molybdenum, is added. Further, the positive electrode current collector 455 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 455 can have a foil-like shape, a plate-like shape (sheet-like shape), a net-like shape, a punching-metal shape, an expanded-metal shape, or the like as appropriate.

As a positive electrode active material used for the positive electrode active material layer, a material into/from which lithium ions can be inserted and extracted can be used. For example, a lithium-containing composite oxide with an olivine crystal structure, a layered rock-salt crystal structure, or a spinel crystal structure can be given.

As the lithium-containing composite oxide with an olivine crystal structure, a composite oxide represented by a general formula $LiMPO_4$ (M is one or more of Fe(II), Mn(II), Co(II), and Ni(II)) can be given. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

$LiFePO_4$ is particularly preferable because it meets requirements with balance for a positive electrode active material, such as safety, stability, high capacity density, high potential, and the existence of lithium ions that can be extracted in initial oxidation (charging).

Examples of the lithium-containing composite oxide with a layered rock-salt crystal structure include lithium cobalt oxide ($LiCoO_2$); $LiNiO_2$; $LiMnO_2$; $Li_2MnO_3$; an NiCo-based lithium-containing composite oxide (a general formula thereof is $LiNi_xCo_{1-x}O_2$ (0<x<1)) such as $LiNi_{0.8}Co_{0.2}O_2$; an NiMn-based lithium-containing composite oxide (a general formula thereof is $LiNi_xMn_{1-x}O_2$ (0<x<1)) such as $LiNi_{0.5}Mn_{0.5}O_2$; and an NiMnCo-based lithium-containing composite oxide (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni, or Mn), and the like can be given.

$LiCoO_2$ is particularly preferable because it has high capacity, is more stable in the air than $LiNiO_2$, and is more thermally stable than $LiNiO_2$, for example.

Examples of the lithium-containing composite oxide with a spinel crystal structure include $LiMn_2O_4$, $Li_{1+x}Mn_{2-x}O_4$, $Li(MnAl)_2O_4$, $LiMn_{1.5}Ni_{0.5}O_4$, and the like.

A lithium-containing composite oxide with a spinel crystal structure including manganese, such as $LiMn_2O_4$, is preferably mixed with a small amount of lithium nickel oxide (e.g., $LiNiO_2$ or $LiNi_{1-x}MO_2$ (M=Co, Al, or the like)), in which case elution of manganese is suppressed, for example.

As the positive electrode active material, a composite oxide represented by a general formula $Li_{(2-j)}MSiO_4$ (M is one or more of Fe(II), Mn(II), Co(II), and Ni(II); $0 \leq j \leq 2$) can be used. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0 < k < 1$, and $0 < l < 1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0 < m < 1$, $0 < n < 1$, and $0 < q < 1$), $Li_{(2-j)}Fe_rNi_sCo_tMn_uSiO_4$ ($r+s+t+u \leq 1$, $0 < r < 1$, $0 < s < 1$, $0 < t < 1$, and $0 < u < 1$), and the like.

Further, as the positive electrode active material, a nasicon compound represented by a general formula $A_xM_2(XO_4)_3$ (A=Li, Na, or Mg; M=Fe, Mn, Ti, V, Nb, or Al; and X=S, P, Mo, W, As, or Si) can be used. Examples of the nasicon compound include $Fe_2(MnO_4)_3$, $Fe_2(SO_4)_3$, $Li_3Fe_2(PO_4)_3$, and the like. Furthermore, as the positive electrode active material, a compound represented by a general formula $Li_2MPO_4F$, $Li_2MP_2O_7$, or $Li_5MO_4$ (M=Fe or Mn); perovskite fluoride such as $NaF_3$ or $FeF_3$; metal chalcogenide such as $TiS_2$ or $MoS_2$ (sulfide, selenide, or telluride); a lithium-containing composite oxide with an inverse spinel crystal structure such as $LiMVO_4$; a vanadium oxide based material (e.g., $V_2O_5$, $V_6O_{13}$, and $LiV_3O_8$); a manganese oxide based material; an organic sulfur based material; or the like can be used.

When carrier ions are alkali metal ions other than lithium ions, such as alkaline-earth metal ions, beryllium ions, or magnesium ions, an alkali metal (e.g., sodium or potassium), an alkaline-earth metal (e.g., calcium, strontium, or barium), beryllium, or magnesium may be used as the positive electrode active material layer 456, instead of lithium in the lithium compound and the lithium-containing composite oxide.

The positive electrode active material layer 456 is formed over the positive electrode current collector 455 by a coating method or a physical vapor deposition method (e.g., a sputtering method), whereby the positive electrode 454 can be formed. In the case where a coating method is employed, the positive electrode active material layer 456 is formed in such a manner that a paste in which a conductive additive (e.g., acetylene black (AB)), a binder (e.g., polyvinylidene fluoride (PVDF)), and the like are mixed with any of the above materials of the positive electrode active material layer 456 is applied to the positive electrode current collector 455 and dried. In this case, the positive electrode active material layer 456 is preferably molded by applying pressure as needed.

Note that as the conductive additive, an electron-conductive material can be used as long as it does not chemically change in the secondary battery. For example, a carbon-based material such as graphite or carbon fibers; a metal material such as copper, nickel, aluminum, or silver; and powder, fiber, and the like of mixtures thereof can be given. Further, graphene may be used instead of these conductive additives. For example, a polar solvent to which a positive electrode active material, a binder, and graphene oxide are added is mixed, and the mixture is subjected to heat treatment or the like to reduce graphene oxide; thus, a positive electrode active material layer containing graphene can be formed. An electron conducting path connecting the positive electrode active materials is formed in the positive electrode active material layer including graphene in such a manner; thus, the positive electrode active material layer can have high electron conductivity, which is similar to the negative electrode of one embodiment of the present invention.

As the binder, instead of polyvinylidene fluoride (PVDF) as a typical one, polyimide, polytetrafluoroethylene, polyvinyl chloride, ethylene-propylene-diene polymer, butadiene rubber, styrene-butadiene rubber, butyl rubber, acrylonitrile-butadiene rubber, fluorine rubber, polyvinyl acetate, polymethyl methacrylate, polyethylene, polypropylene, nitrocellulose or the like can be used.

The positive electrode active material layer 456 is not necessarily formed on and in direct contact with the positive electrode current collector 455. Between the positive electrode current collector 455 and the positive electrode active material layer 456, any of the following functional layers may be formed using a conductive material such as a metal: an adhesive layer for the purpose of improving adhesiveness between the positive electrode current collector 455 and the positive electrode active material layer 456, a planarization layer for reducing unevenness of the surface of the positive electrode current collector 455, a heat radiation layer for radiating heat, and a stress relaxation layer for reducing stress on the positive electrode current collector 455 or the positive electrode active material layer 456. Further, to have these functions, treatment for modifying a state of a surface may be performed on the surface of the positive electrode current collector 455.

Next, as the separator 460, a porous insulator such as cellulose (paper), polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may also be used.

As a solvent for the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

As an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

For the positive electrode can 451 and the negative electrode can 452, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 451 and the negative electrode can 452 are electrically connected to the positive electrode 454 and the negative electrode 457, respectively.

The negative electrode 457, the positive electrode 454, and the separator 460 are immersed in the electrolyte solution. Then, as illustrated in FIG. 9A, the positive electrode can 451, the positive electrode 454, the separator 460, the negative electrode 457, and the negative electrode can 452 are stacked in this order with the positive electrode can 451 positioned at the bottom, and the positive electrode can 451 and the negative electrode can 452 are subjected to pressure bonding with the gasket 453 interposed therebetween. In such a manner, the coin-type secondary battery 450 is manufactured.

(Laminated Secondary Battery)

Figure 9B:
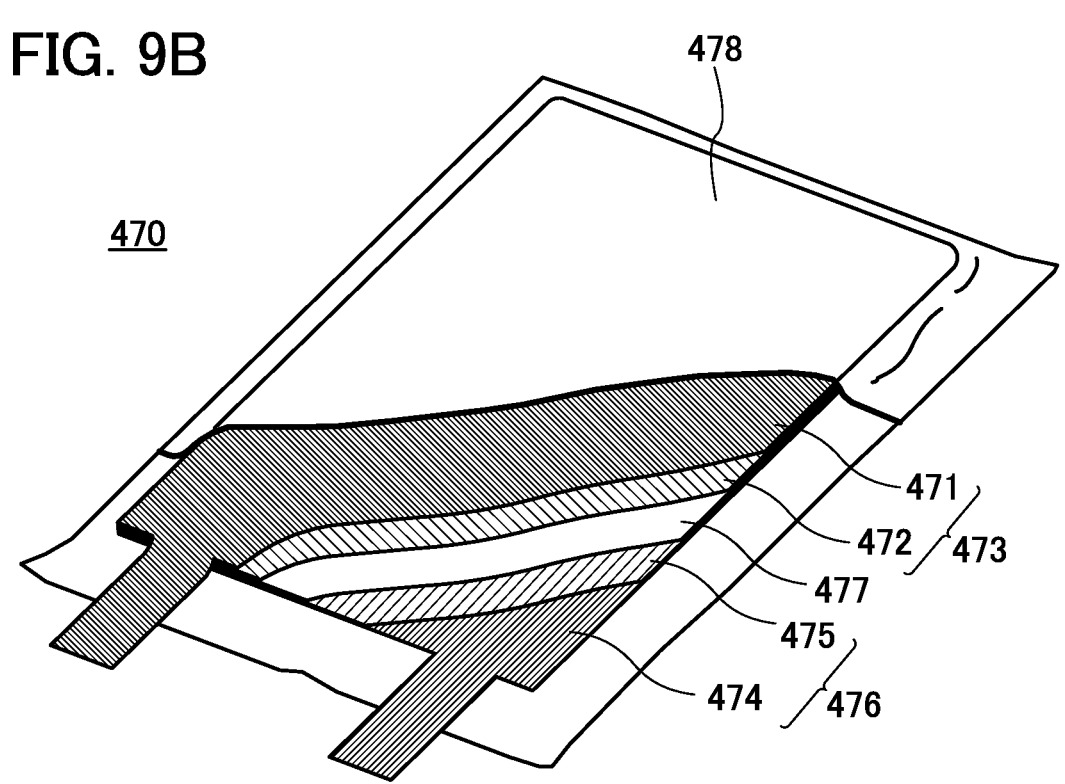

Next, an example of a laminated secondary battery is described with reference to FIG. 9B. In FIG. 9B, a structure inside the laminated secondary battery is partly exposed for convenience.

A laminated secondary battery 470 illustrated in FIG. 9B includes a positive electrode 473 including a positive electrode current collector 471 and a positive electrode active material layer 472, a negative electrode 476 including a negative electrode current collector 474 and a negative electrode active material layer 475, a separator 477, an electrolyte solution (not illustrated), and an exterior body 478. The separator 477 is placed between the positive electrode 473 and the negative electrode 476 provided in the exterior body 478. The exterior body 478 is filled with the electrolyte solution. Although the one positive electrode 473, the one negative electrode 476, and the one separator 477 are used in FIG. 9B, the secondary battery may have a stacked-layer structure in which positive electrodes, negative electrodes, and separators are alternately stacked.

As the negative electrode 476, any of the negative electrodes 100, 200, 300, and 350 described in the above embodiments is used.

For the electrolyte solution, an electrolyte and a solvent which are similar to those in the above-described coin-type secondary battery can be used.

In the laminated secondary battery 470 illustrated in FIG. 9B, the positive electrode current collector 471 and the negative electrode current collector 474 also serve as terminals (tabs) for an electrical contact with the outside. For this reason, the positive electrode current collector 471 and the negative electrode current collector 474 are provided so that part of the positive electrode current collector 471 and part of the negative electrode current collector 474 are exposed outside the exterior body 478.

As the exterior body 478 in the laminated secondary battery 470, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be obtained.

(Cylindrical Secondary Battery)

Figures 10A, 10B:
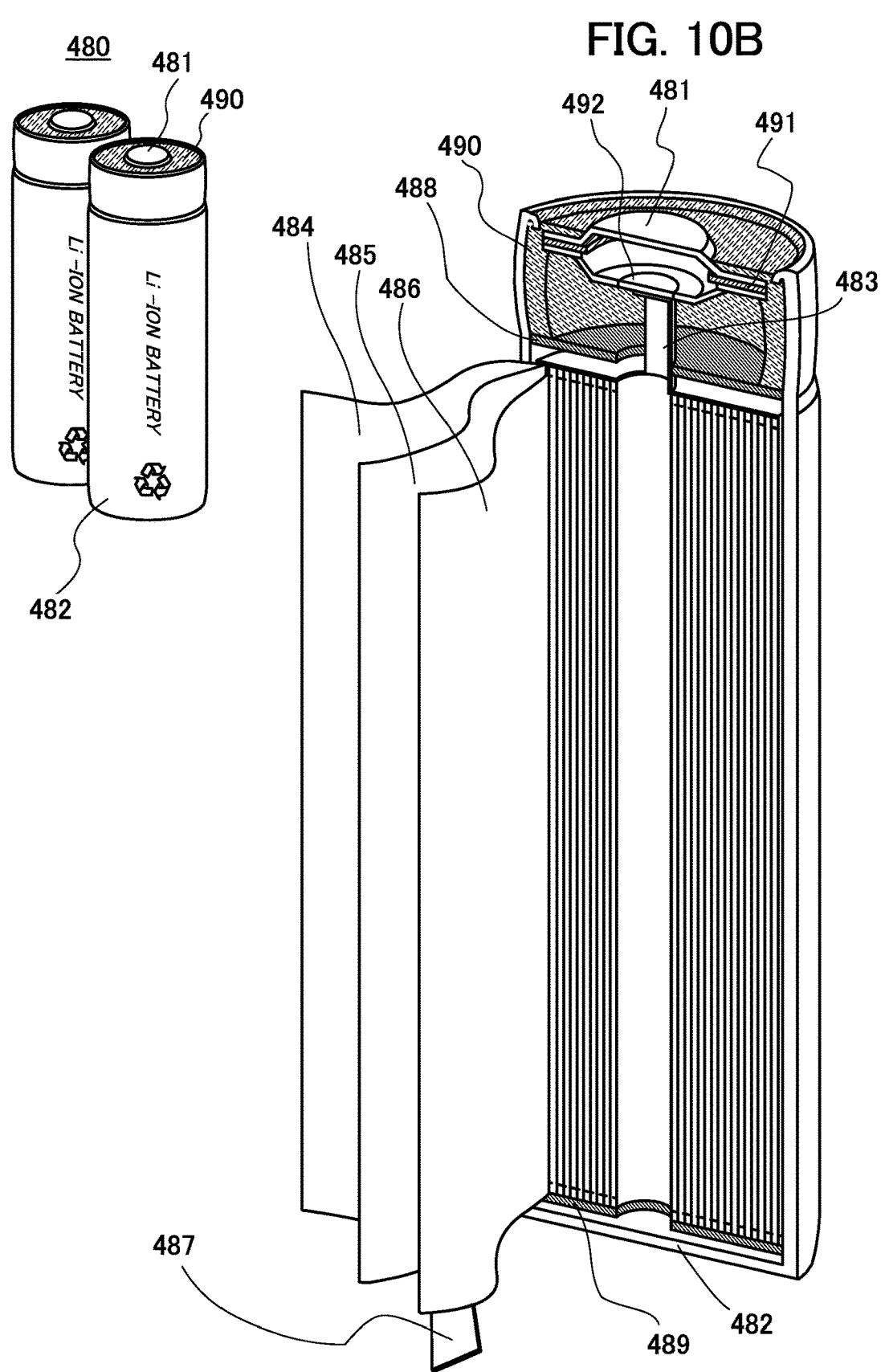
FIGS. 10A and 10B illustrate a cylindrical secondary battery.

Next, an example of a cylindrical secondary battery is described with reference to FIGS. 10A and 10B. As illustrated in FIG. 10A, a cylindrical secondary battery 480 includes a positive electrode cap (battery cap) 481 on a top surface and a battery can (outer can) 482 on the side surface and bottom surface. The positive electrode cap 481 and the battery can 482 are insulated from each other by a gasket 490 (insulating packing).

FIG. 10B is a diagram schematically illustrating a cross section of the cylindrical secondary battery. In the battery can 482 with a hollow cylindrical shape, a battery element is provided in which a strip-like positive electrode 484 and a strip-like negative electrode 486 are wound with a separator 485 provided therebetween. Although not illustrated, the battery element is wound around a center pin as a center. One end of the battery can 482 is close and the other end thereof is open.

As the negative electrode 486, any of the negative electrodes 100, 200, 300, and 350 described in the above embodiments is used.

For the battery can 482, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 482, the battery element in which the positive electrode, the negative electrode, and the separator are wound is provided between a pair of insulating plates 488 and 489 which face each other.

An electrolyte solution (not illustrated) is injected inside the battery can 482 in which the battery element is provided. For the electrolyte solution, an electrolyte and a solvent which are similar to those in the above-described coin-type secondary battery and laminated secondary battery can be used.

Since the positive electrode 484 and the negative electrode 486 of the cylindrical secondary battery are wound, active materials are formed on both sides of the current collectors. A positive electrode terminal (positive electrode current collecting lead) 483 is connected to the positive electrode 484, and a negative electrode terminal (negative electrode current collecting lead) 487 is connected to the negative electrode 486. A metal material such as aluminum can be used for both the positive electrode terminal 483 and the negative electrode terminal 487. The positive electrode terminal 483 and the negative electrode terminal 487 are resistance-welded to a safety valve mechanism 492 and the bottom of the battery can 482, respectively. The safety valve mechanism 492 is electrically connected to the positive electrode cap 481 through a positive temperature coefficient (PTC) element 491. In the case where an internal pressure of the battery is increased to exceed a predetermined threshold value, the safety valve mechanism 492 electrically disconnects the positive electrode cap 481 and the positive electrode 484. The PTC element 491 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Note that in this embodiment, the coin-type secondary battery, the laminated secondary battery, and the cylindrical secondary battery are given as examples of the secondary battery; however, any of secondary batteries with other various shapes, such as a sealed secondary battery and a square secondary battery, can be used. Further, a structure in which a plurality of positive electrodes, a plurality of negative electrodes, and a plurality of separators are stacked or rolled may be employed.

This embodiment can be implemented in combination with any of the other embodiments as appropriate.

Embodiment 4

The secondary battery of one embodiment of the present invention can be used as a power source for a variety of electronic devices which can operate with electric power.

Specific examples of electronic devices each using the secondary battery of one embodiment of the present invention are as follows: display devices such as televisions and monitors, lighting devices, desktop personal computers and laptop personal computers, word processors, image reproduction devices which reproduce still images and moving images stored in recording media such as digital versatile discs (DVDs), portable compact disc (CD) players, radio receivers, tape recorders, headphone stereos, stereos, remote controls, table clocks, wall clocks, cordless phone handsets, transceivers, cell phones, car phones, portable game machines, passometers, calculators, portable information terminals, electronic notebooks, e-book readers, electronic translators, audio input devices, cameras such as video cameras and digital still cameras, toys, electric shavers, electric toothbrushes, high-frequency heating devices such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke sensors, and medical equipment such as hearing aids, cardiac pacemakers, and dialyzers. The examples also include industrial equipment such as guide lights, traffic lights, meters such as gas meters and water meters, belt conveyors, elevators, escalators, industrial robots, radio relay stations, cell phone base stations, power storage systems, and power storage devices for leveling the amount of power supply and smart grid. In addition, moving objects driven by motors using electric power from a secondary battery are also included in the category of electronic devices. Examples of the moving objects include electric vehicles (EV), hybrid electric vehicles (HEV) which include both an internal-combustion engine and a motor, plug-in hybrid electric vehicles (PHEV), tracked vehicles in which caterpillars are substituted for wheels of these vehicles, motorized bicycles including motor-assisted bicycles, motorcycles, electric wheelchairs, golf carts, boats, ships, submarines, aircrafts such as fixed wing aircrafts and rotorcrafts, rockets, artificial satellites, space probes, planetary probes, and spacecrafts.

In the above electronic devices, the secondary battery of one embodiment of the present invention can be used as a main power source for supplying enough power for almost the whole power consumption. Alternatively, in the above electronic devices, the secondary battery of one embodiment of the present invention can be used as an uninterruptible power source which can supply power to the electronic devices when the supply of power from the main power source or a commercial power source is stopped. Still alternatively, in the above electronic devices, the secondary battery of one embodiment of the present invention can be used as an auxiliary power source for supplying power to the electronic devices at the same time as the power supply from the main power source or a commercial power source.

Figure 11:
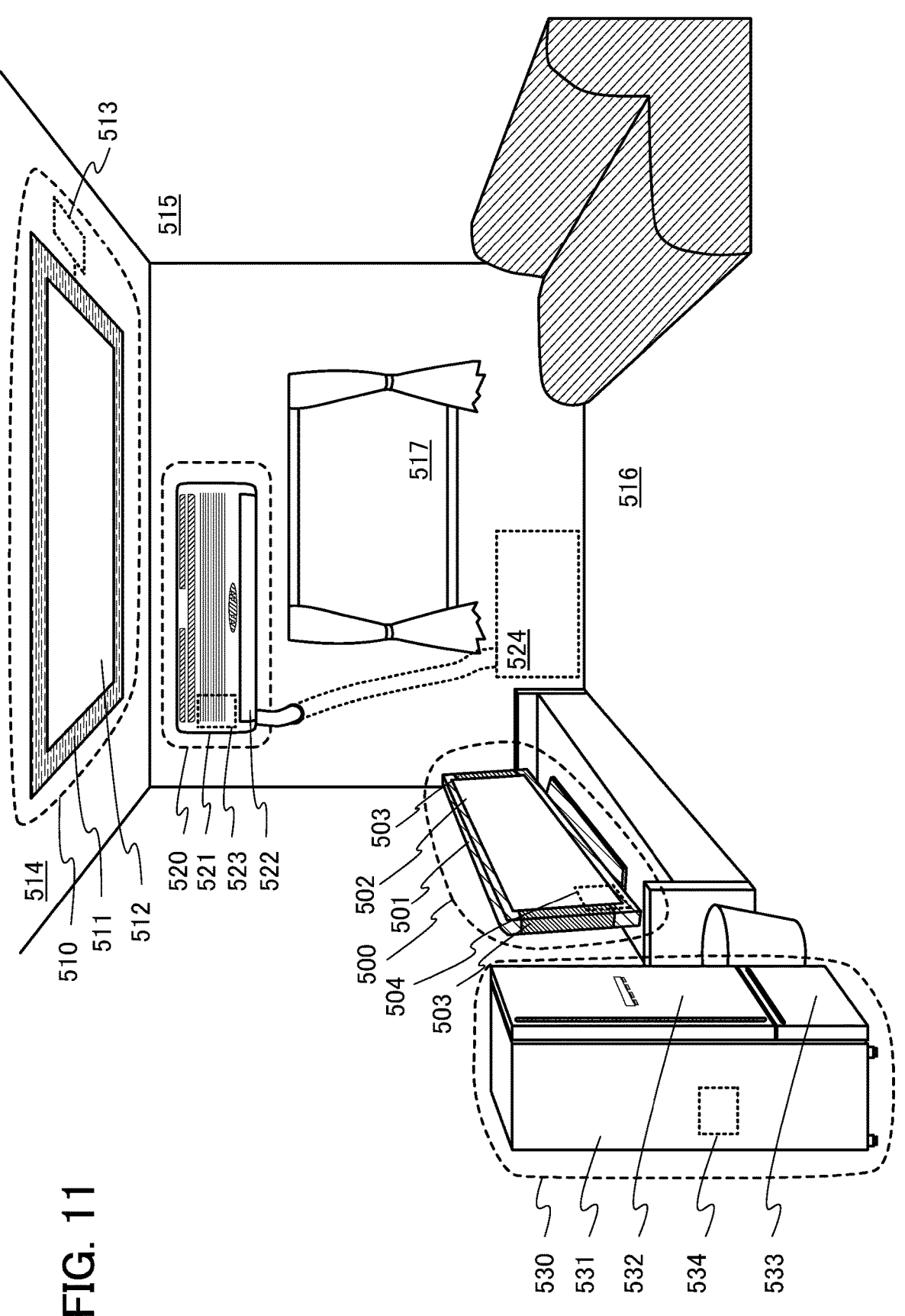
FIG. 11 illustrates electronic devices.

FIG. 11 illustrates specific structures of the electronic devices. In FIG. 11, a display device 500 is an example of an electronic device including a secondary battery 504 of one embodiment of the present invention. Specifically, the display device 500 corresponds to a display device for TV broadcast reception and includes a housing 501, a display portion 502, speaker portions 503, the secondary battery 504, and the like. The secondary battery 504 of one embodiment of the present invention is provided in the housing 501. The display device 500 can receive power from a commercial power source. Alternatively, the display device 500 can use power stored in the secondary battery 504. Thus, the display device 500 can be operated with the use of the secondary battery 504 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 502.

Note that the display device includes, in its category, all of information display devices for personal computers, advertisement displays, and the like in addition to TV broadcast reception.

In FIG. 11, an installation lighting device 510 is an example of an electronic device using a secondary battery 513 of one embodiment of the present invention. Specifically, the installation lighting device 510 includes a housing 511, a light source 512, the secondary battery 513, and the like. Although FIG. 11 illustrates the case where the secondary battery 513 is provided in a ceiling 514 on which the housing 511 and the light source 512 are installed, the secondary battery 513 may be provided in the housing 511. The installation lighting device 510 can receive power from a commercial power source. Alternatively, the installation lighting device 510 can use power stored in the secondary battery 513. Thus, the installation lighting device 510 can be operated with the use of the secondary battery 513 of one embodiment of the present invention as an uninterruptible power source even when power cannot be supplied from a commercial power source due to power failure or the like.

Note that although the installation lighting device 510 provided in the ceiling 514 is illustrated in FIG. 11 as an example, the secondary battery of one embodiment of the present invention can be used as an installation lighting device provided in, for example, a wall 515, a floor 516, a window 517, or the like other than the ceiling 514. Alternatively, the secondary battery can be used in a tabletop lighting device or the like.

As the light source 512, an artificial light source which emits light artificially by using power can be used. Specifically, an incandescent lamp, a discharge lamp such as a fluorescent lamp, and a light-emitting element such as an LED and an organic EL element are given as examples of the artificial light source.

In FIG. 11, an air conditioner including an indoor unit 520 and an outdoor unit 524 is an example of an electronic device using a secondary battery 523 of one embodiment of the present invention. Specifically, the indoor unit 520 includes a housing 521, an air outlet 522, the secondary battery 523, and the like. Although FIG. 11 illustrates the case where the secondary battery 523 is provided in the indoor unit 520, the secondary battery 523 may be provided in the outdoor unit 524. Alternatively, the secondary battery 523 may be provided in both the indoor unit 520 and the outdoor unit 524. The air conditioner can receive power from a commercial power source. Alternatively, the air conditioner can use power stored in the secondary battery 523. Particularly in the case where the secondary batteries 523 are provided in both the indoor unit 520 and the outdoor unit 524, the air conditioner can be operated with the use of the secondary battery 523 of one embodiment of the present invention as an uninterruptible power source even when power cannot be supplied from a commercial power source due to power failure or the like.

Note that although the split-type air conditioner including the indoor unit and the outdoor unit is illustrated in FIG. 11 as an example, the secondary battery of one embodiment of the present invention can be used in an air conditioner in which the functions of an indoor unit and an outdoor unit are integrated in one housing.

In FIG. 11, an electric refrigerator-freezer 530 is an example of an electronic device using a secondary battery 534 of one embodiment of the present invention. Specifically, the electric refrigerator-freezer 530 includes a housing 531, a door for a refrigerator 532, a door for a freezer 533, the secondary battery 534, and the like. The secondary battery 534 is provided inside the housing 531 in FIG. 11. The electric refrigerator-freezer 530 can receive power from a commercial power source. Alternatively, the electric refrigerator-freezer 530 can use power stored in the secondary battery 534. Thus, the electric refrigerator-freezer 530 can be operated with the use of the secondary battery 534 of one embodiment of the present invention as an uninterruptible power source even when power cannot be supplied from a commercial power source due to power failure or the like.

Note that among the electronic devices described above, a high-frequency heating device such as a microwave oven and an electronic device such as an electric rice cooker require high power in a short time. The tripping of a circuit breaker of a commercial power source in use of electronic devices can be prevented by using the secondary battery of one embodiment of the present invention as an auxiliary power source for supplying power which cannot be supplied enough by a commercial power source.

In addition, in a time period when electronic devices are not used, particularly when the proportion of the amount of power which is actually used to the total amount of power which can be supplied from a commercial power source (such a proportion referred to as a usage rate of power) is low, power can be stored in the secondary battery, whereby the usage rate of power can be reduced in a time period when the electronic devices are used. For example, in the case of the electric refrigerator-freezer 530, power can be stored in the secondary battery 534 in nighttime when the temperature is low and the door for a refrigerator 532 and the door for a freezer 533 are not often opened and closed. On the other hand, in daytime when the temperature is high and the door for a refrigerator 532 and the door for a freezer 533 are frequently opened and closed, the secondary battery 534 is used as an auxiliary power source; thus, the usage rate of power in daytime can be reduced.

This embodiment can be implemented in combination with any of the other embodiments as appropriate.

Embodiment 5

Next, a portable information terminal which is an example of a portable electronic device is described with reference to FIGS. 12A to 12C.

Figure 12A:
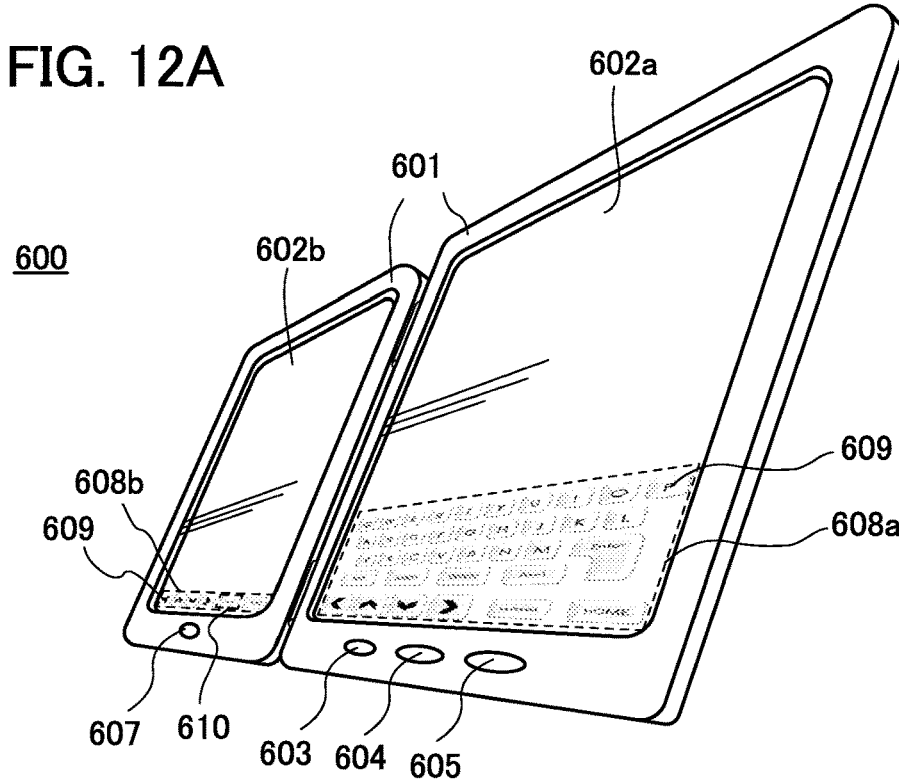
FIGS. 12A to 12C illustrate an electronic device.
Figure 12B:
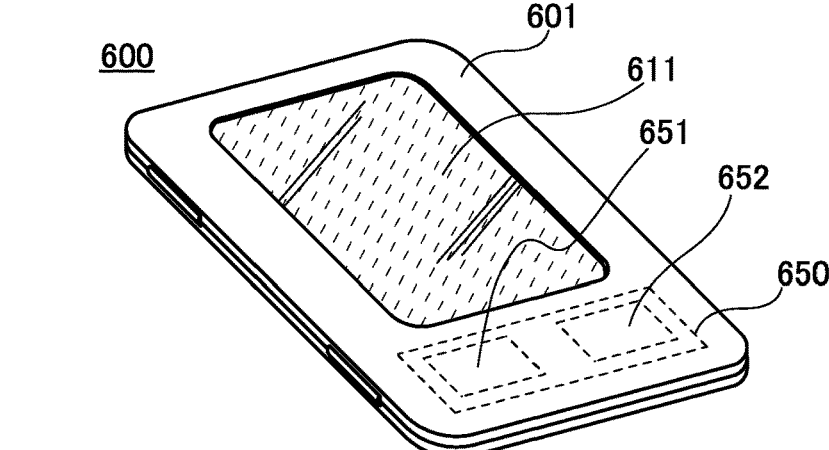

FIGS. 12A and 12B illustrate a tablet terminal 600 that can be folded. FIG. 12A illustrates the tablet terminal 600 in the state of being unfolded. The tablet terminal 600 includes a housing 601, a display portion 602a, a display portion 602b, a switch 603 for switching display modes, a power switch 604, a switch 605 for switching to power-saving mode, and an operation switch 607.

Part of the display portion 602a can be a touch panel region 608a and data can be input when a displayed operation key 609 is touched. Note that FIG. 12A illustrates, as an example, that half of the area of the display portion 602a has only a display function and the other half of the area has a touch panel function. However, the structure of the display portion 602a is not limited to this, and all the area of the display portion 602a may have a touch panel function. For example, all the area of the display portion 602a can display keyboard buttons and serve as a touch panel while the display portion 602b can be used as a display screen.

Like the display portion 602a, part of the display portion 602b can be a touch panel region 608b. When a finger, a stylus, or the like touches the place where a button 610 for switching to keyboard display is displayed in the touch panel, keyboard buttons can be displayed on the display portion 602b.

Touch input can be performed on the touch panel regions 608a and 608b at the same time.

The switch 603 for switching display modes can switch the display between portrait mode, landscape mode, and the like, and between monochrome display and color display, for example. With the switch 605 for switching to power-saving mode, the luminance of display can be optimized depending on the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although the display area of the display portion 602a is the same as that of the display portion 602b in FIG. 12A, one embodiment of the present invention is not particularly limited thereto. The display area of the display portion 602a may be different from that of the display portion 602b, and further, the display quality of the display portion 602a may be different from that of the display portion 602b. For example, one of them may be a display panel that can display higher-definition images than the other.

FIG. 12B illustrates the tablet terminal 600 in the state of being closed. The tablet terminal 600 includes the housing 601, a solar cell 611, a charge and discharge control circuit 650, a battery 651, and a DCDC converter 652. Note that FIG. 12B illustrates an example in which the charge and discharge control circuit 650 includes the battery 651 and the DCDC converter 652, and the battery 651 includes the secondary battery of one embodiment of the present invention.

Since the tablet terminal 600 can be folded, the housing 601 can be closed when the tablet terminal 600 is not in use. Thus, the display portions 602a and 602b can be protected, thereby providing the tablet terminal 600 with excellent endurance and excellent reliability for long-term use.

The tablet terminal illustrated in FIGS. 12A and 12B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 611, which is attached on the surface of the tablet terminal 600, supplies power to the touch panel, the display portion, a video signal processor, and the like. Note that the solar cell 611 is preferably provided on one or both surfaces of the housing 601, in which case the battery 651 can be charged efficiently.

The structure and operation of the charge and discharge control circuit 650 illustrated in FIG. 12B are described with reference to a block diagram in FIG. 12C. The solar cell 611, the battery 651, the DCDC converter 652, a converter 653, switches SW1 to SW3, and the display portion 602 are illustrated in FIG. 12C, and the battery 651, the DCDC converter 652, the converter 653, and the switches SW1 to SW3 correspond to the charge and discharge control circuit 650 illustrated in FIG. 12B.

First, an example of the operation in the case where power is generated by the solar cell 611 using external light is described. The voltage of power generated by the solar cell 611 is raised or lowered by the DCDC converter 652 so that the power has a voltage for charging the battery 651. Then, when the power from the solar cell 611 is used for the operation of the display portion 602, the switch SW1 is turned on and the voltage of the power is raised or lowered by the converter 653 so as to be a voltage needed for the display portion 602. In addition, when display on the display portion 602 is not performed, the switch SW1 may be turned off and the switch SW2 may be turned on so that the battery 651 is charged.

Here, the solar cell 611 is described as an example of a power generation means; however, there is no particular limitation on the power generation means, and the battery 651 may be charged with another power generation means such as a piezoelectric element or a thermoelectric conversion element (Peltier element). For example, the battery 651 may be charged with a non-contact power transmission module that transmits and receives power wirelessly (without contact) to charge the battery or with a combination of other charging means.

Figure 12C:
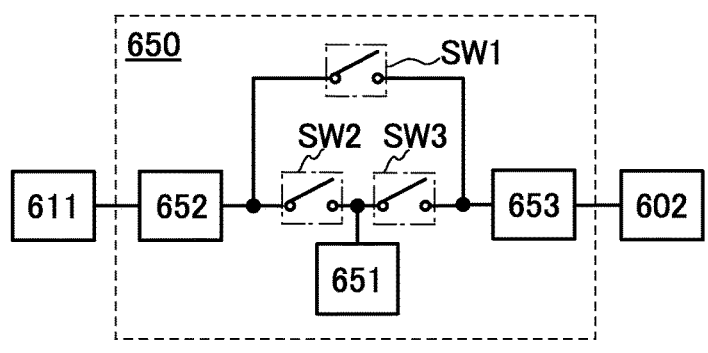

It is needless to say that one embodiment of the present invention is not limited to the electronic device illustrated in FIGS. 12A to 12C as long as the electronic device is equipped with the secondary battery of one embodiment of the present invention which is described in any of the above embodiments.

Embodiment 6

An example of the moving object which is an example of the electronic devices is described with reference to FIGS. 13A and 13B.

The secondary battery described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 13A:
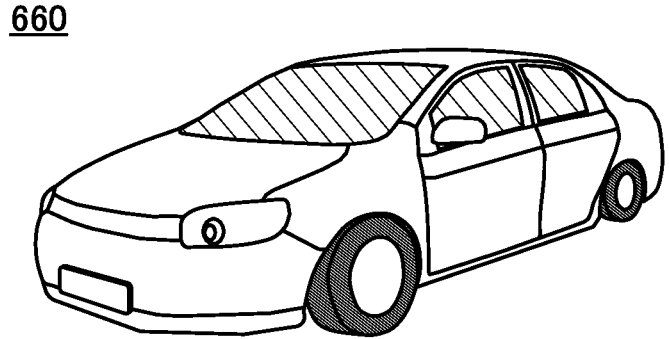
FIGS. 13A and 13B illustrate an electronic device.
Figure 13B:
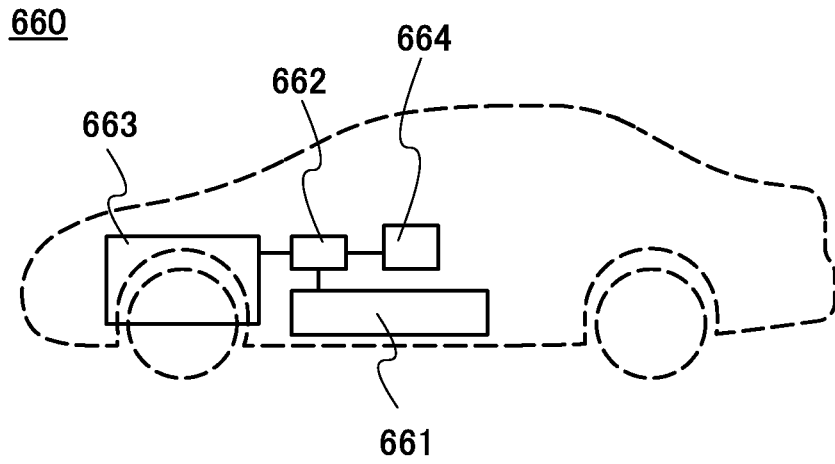

FIGS. 13A and 13B illustrate an example of an electric vehicle. An electric vehicle 660 is equipped with a battery 661. The output of power of the battery 661 is adjusted by a control circuit 662 and the power is supplied to a driving device 663. The control circuit 662 is controlled by a processing unit 664 including a ROM, a RAM, a CPU, or the like which is not illustrated.

The driving device 663 includes a DC motor or an AC motor either alone or in combination with an internal-combustion engine. The processing unit 664 outputs a control signal to the control circuit 662 based on input data such as data on operation (e.g., acceleration, deceleration, or stop) by a driver of the electric vehicle 660 or data on driving the electric vehicle 660 (e.g., data on an upgrade or a downgrade, or data on a load on a driving wheel). The control circuit 662 adjusts the electric energy supplied from the battery 661 in accordance with the control signal of the processing unit 664 to control the output of the driving device 663. In the case where the AC motor is mounted, although not illustrated, an inverter which converts direct current into alternate current is also incorporated.

The battery 661 can be charged by external electric power supply using a plug-in technique. For example, the battery 661 is charged by a commercial power source through a power plug. The battery 661 can be charged by converting external power into DC constant voltage having a predetermined voltage level through a converter such as an AC-DC converter. Providing the secondary battery of one embodiment of the present invention as the battery 661 can contribute to an increase in the capacity of the battery, so that convenience can be improved. When the battery 661 itself can be made compact and lightweight with improved characteristics of the battery 661, the vehicle can be made lightweight, leading to an increase in fuel efficiency.

Note that it is needless to say that one embodiment of the present invention is not limited to the electronic devices described above as long as the secondary battery of one embodiment of the present invention is included.

This embodiment can be implemented in combination with any of the other embodiments as appropriate.

Example 1

In this example, results of examining the correlation between a direction of an electric field and a direction of surfaces of graphene layers included in graphite are described.

Specifically, in each of the case where surfaces of a plurality of graphene layers included in graphite used as an active material of a negative electrode are provided substantially along or in parallel to the direction of an electric field (i.e., the case where an edge plane is the uppermost surface of the negative electrode) and the case where surfaces of graphene layers are provided substantially perpendicular to the direction of the electric field (i.e., the case where a basal plane is the uppermost surface of the negative electrode), the degree of lithium insertion and extraction was measured by cyclic voltammetry (hereinafter referred to as CV measurement).

A coin cell was used in the CV measurement. A piece of graphite to be examined was used as a working electrode; metallic lithium, a counter electrode; a mixed solution of an ethylene carbonate (EC) solution and diethyl carbonate (DEC) (volume ratio of 1:1) in which 1M lithium perchlorate ($LiClO_4$) was dissolved, an electrolyte solution; and polypropylene (PP), a separator. The measurement was performed at a scanning rate of 1.0 mV/sec in a scan range from 0.01 V to 2.5 V (vs. $Li/Li^+$) for 3 cycles.

Figure 14A:
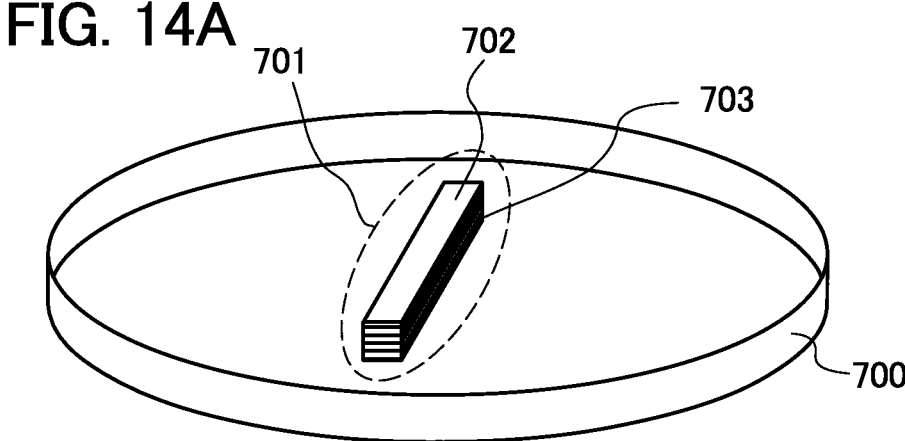
FIGS. 14A and 14B illustrate cells used in CV measurement.
Figure 14B:
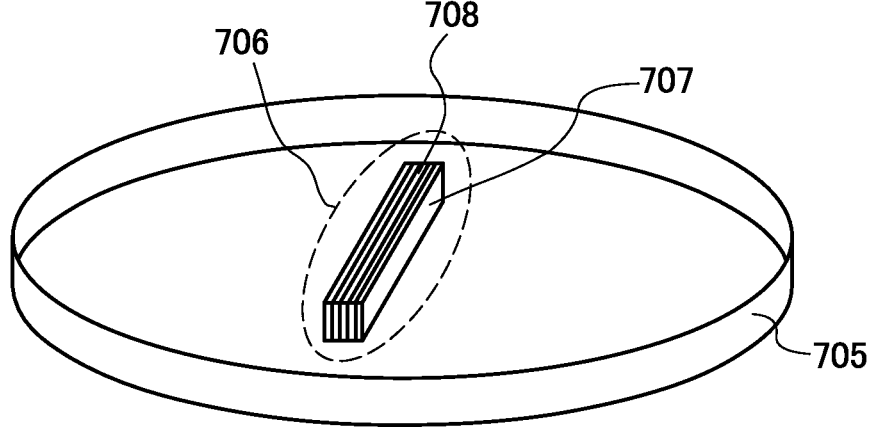

Here, as the piece of graphite to be examined, HOPG 701 and HOPG 706 each of which was cut into a rectangular parallelepiped (1.7 mm×1.7 mm×10 mm) with a dicing machine to have a weight of approximately 0.05 g were used. As illustrated in FIGS. 14A and 14B, the HOPG 701 was set in a coin cell 700 so that a basal plane thereof was exposed as a top surface (see FIG. 14A), and the HOPG 706 was set in a coin cell 705 so that an edge plane thereof was exposed as a top surface (see FIG. 14B). The separator and the metallic lithium were provided over each of the HOPG 701 and the HOPG 706. The former is referred to as a cell A and the latter, a cell B.

Figure 15A:
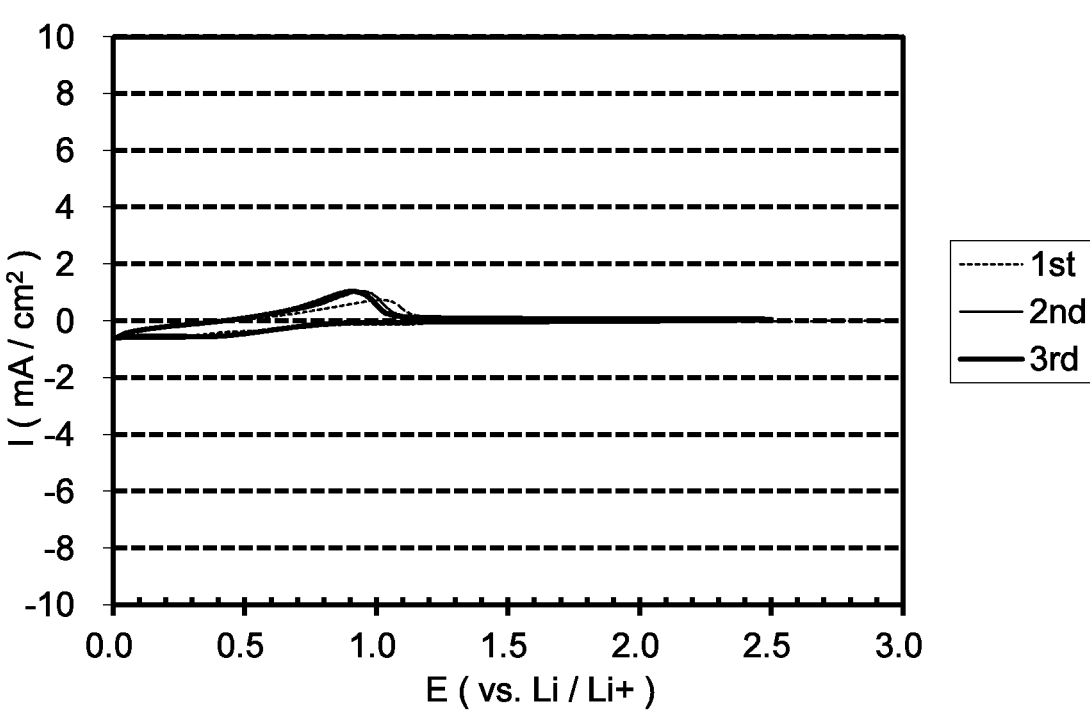
FIGS. 15A and 15B show results of CV measurement.
Figure 15B:
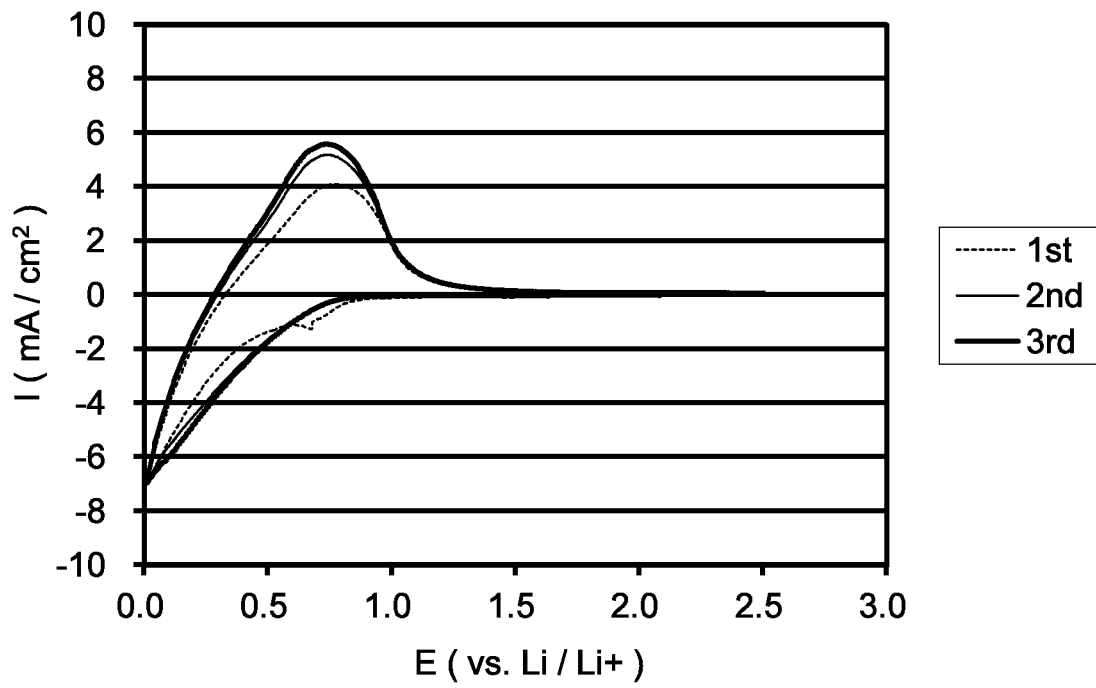

The results of the CV measurement are shown in FIGS. 15A and 15B. FIG. 15A shows the results of the CV measurement of the cell A. The horizontal axis represents an electric potential (V vs. Li/Li$^+$) and the vertical axis represents current density (mA/g). In the graph, the dotted lines show the results in the first cycle; the solid lines, the results in the second cycle; and the thick lines, the results in the third cycle. In all of the cycles, the current density varied from −2 V to 2 V (vs. Li/Li$^+$) in the scan range, and the peak of the current density, which was observed when the electric potential was around 1.1 V in the forward scan, was not high. The measurement results did not depend on the number of cycles.

On the other hand, in the results of the CV measurement of the cell B in FIG. 15B, current density higher than that in the results of the CV measurement of the cell A was observed. In particular, marked peaks were observed when the electric potential was around 0.7 V (vs. Li/Li$^+$) in the forward scan. The peak values increased as the number of cycles increased from the first cycle (dotted line) to the second cycle (solid line) and the third cycle (thick line).

As illustrated in FIG. 14A, in the cell A, the HOPG 701 which is the active material in the shape of the rectangular parallelepiped was set so that a basal plane 702 thereof faces upward (faces the counter electrode). Thus, there were two edge planes 703 on the side surfaces of the HOPG 701, and therefore the area of the edge planes which were exposed to the electrolyte solution was larger than the area of the basal plane which was exposed to the electrolyte solution. The surfaces of the plurality of graphene layers included in the HOPG 701 were not provided in parallel to the direction of the electric field. The results of the CV measurement of the cell A showed the low current density, that is, low reactivity of the electrode.

On the other hand, as illustrated in FIG. 14B, in the cell B, the HOPG 706 which is the active material in the shape of the rectangular parallelepiped was set so that the edge plane 708 thereof faces upward (faces the counter electrode). Thus, there were two basal planes 707 on the side surfaces of the HOPG 706, and therefore the area of the edge plane which was exposed to the electrolyte solution was smaller than the area of the basal planes which were exposed to the electrolyte solution in the HOPG 706. The surfaces of the plurality of graphene layers included in the HOPG 706 were provided substantially along or in parallel to the direction of the electric field. The results of the CV measurement of the cell B showed the high current density, that is, high reactivity of the electrode.

These results suggest that surfaces of a plurality of graphene layers provided substantially along or in parallel to the direction of an electric field enable an electrode to have high reactivity, that is, lithium is inserted and extracted efficiently.

This application is based on Japanese Patent Application serial no. 2012-161489 filed with Japan Patent Office on Jul. 20, 2012, the entire contents of which are hereby incorporated by reference.

What is claimed is:

1. A battery comprising:
a positive electrode comprising a positive electrode active material;
a negative electrode comprising:
    a graphite particle comprising a plurality of graphene layers; and
    a film covering the graphite particle comprising one or more of silicon and phosphorous; and
an electrolyte between the positive electrode and the negative electrode,
wherein an edge of each of the plurality of graphene layers is chemically bonded to the film by one of C—O—Si and C—O—P.

2. The battery according to claim 1, wherein the graphite particle is highly oriented pyrolytic graphite.

3. The battery according to claim 1,
wherein the negative electrode further comprises a negative electrode current collector, and
wherein an angle between surfaces of the plurality of graphene layers and a surface of the negative electrode current collector ranges between 70° and 110°.

4. A secondary battery comprising:
a positive electrode comprising a positive electrode active material;
a negative electrode comprising:
    a negative electrode current collector;
    a negative electrode layer over the negative electrode current collector; and
an electrolyte between the positive electrode and the negative electrode,
wherein the negative electrode layer comprises:
    a graphite particle comprising a plurality of graphene layers; and
    a film covering the graphite particle comprising one or more of silicon and phosphorous,
wherein the graphite particle is in contact with the negative electrode e collector,
wherein the graphite particle is natural graphite or artificial graphite,
wherein an edge of each of the plurality of graphene layers is chemically bonded to the film by one of C—O—Si and C—O—P, and
wherein the graphite particle is capable of inserting and extracting lithium ions via the film.

5. The secondary battery according to claim 4, wherein an angle between surfaces of the plurality of graphene layers and a surface of the negative electrode current collector ranges between 70° and 110°.

* * * * *